US010128699B2

(12) United States Patent
Leabman

(10) Patent No.: US 10,128,699 B2
(45) Date of Patent: Nov. 13, 2018

(54) SYSTEMS AND METHODS OF PROVIDING WIRELESS POWER USING RECEIVER DEVICE SENSOR INPUTS

(71) Applicant: ENERGOUS CORPORATION, San Jose, CA (US)

(72) Inventor: Michael A. Leabman, San Ramon, CA (US)

(73) Assignee: Energous Corporation, San Jose, CA (US)

( * ) Notice: Subject to any disclaimer, the term of this patent is extended or adjusted under 35 U.S.C. 154(b) by 195 days.

(21) Appl. No.: 15/060,167

(22) Filed: Mar. 3, 2016

(65) Prior Publication Data

US 2016/0204622 A1 Jul. 14, 2016

Related U.S. Application Data

(63) Continuation-in-part of application No. 14/856,337, filed on Sep. 16, 2015, and a continuation-in-part of (Continued)

(51) Int. Cl.
*H02J 50/80* (2016.01)
*H02J 50/20* (2016.01)
(Continued)

(52) U.S. Cl.
CPC .............. *H02J 50/80* (2016.02); *H02J 50/20* (2016.02); *H04W 4/70* (2018.02); *H02J 7/025* (2013.01); *H02J 50/60* (2016.02)

(58) Field of Classification Search
CPC ...................................................... H02J 50/80
See application file for complete search history.

(56) References Cited

U.S. PATENT DOCUMENTS 787,412 A 4/1905 Tesla
3,167,775 A 1/1965 Guertler
(Continued)

FOREIGN PATENT DOCUMENTS

CN 203826555 U 9/2014
CN 104090265 A 10/2014
(Continued)

OTHER PUBLICATIONS

Energous Corp., Written Opinion, PCT/US2014/037170, dated Sep. 15, 2014, 7 pgs.

(Continued)

*Primary Examiner* — Daniel Cavallari
(74) *Attorney, Agent, or Firm* — Morgan, Lewis & Bockius LLP

(57) ABSTRACT

A method for wireless power transmission is performed at a wireless power transmitter. The method includes: (i) requesting sensor data from a receiver device; (ii) receiving sensor data from the receiver device in response to the request, wherein the sensor data is generated by one or more sensors of the receiver device; and (iii) determining whether the receiver device is in a proscribed state for wireless power reception based on the received sensor data. The method further includes, in accordance with determining that the receiver device is not in the proscribed state: transmitting, by antennas of the wireless power transmitter, a plurality of wireless power transmission waves to the receiver device so that each wireless power transmission wave of the plurality of wireless power transmission waves constructively interferes with at least one other wireless power transmission wave of the plurality of wireless power transmission waves.

24 Claims, 5 Drawing Sheets

100
External Mapping Memory 104
102 Transmitter
114 Antenna Array
102 Transmitter
114 Antenna Array
112 Communication Component
112 Communication Component
108 Communications signals
108 Communications signals
110 Power Waves
119
106 Receiver
107 Electronic Device
118 Pocket of Energy

Related U.S. Application Data application No. 14/584,412, filed on Dec. 29, 2014, which is a continuation-in-part of application No. 14/330,939, filed on Jul. 14, 2014.

(60) Provisional application No. 62/272,571, filed on Dec. 29, 2015.

(51) Int. Cl.

*H04W 4/70* (2018.01)
*H02J 7/02* (2016.01)
*H02J 50/60* (2016.01)

(56) References Cited

U.S. PATENT DOCUMENTS 3,434,678 A 3/1969 Brown et al.
3,696,384 A 10/1972 Lester
3,754,269 A 8/1973 Clavin
4,101,895 A 7/1978 Jones, Jr.
4,360,741 A 11/1982 Fitzsimmons et al.
4,944,036 A 7/1990 Hyatt
4,995,010 A 2/1991 Knight
5,200,759 A 4/1993 McGinnis
5,211,471 A 5/1993 Rohrs
5,548,292 A 8/1996 Hirshfield et al.
5,556,749 A 9/1996 Mitsuhashi et al.
5,568,088 A 10/1996 Dent et al.
5,646,633 A 7/1997 Dahlberg
5,697,063 A 12/1997 Kishigami et al.
5,712,642 A 1/1998 Hulderman
5,936,527 A 8/1999 Isaacman et al.
5,982,139 A 11/1999 Parise
6,046,708 A 4/2000 MacDonald, Jr. et al.
6,127,799 A 10/2000 Krishnan
6,127,942 A 10/2000 Welle
6,163,296 A 12/2000 Lier et al.
6,289,237 B1 9/2001 Mickle et al.
6,329,908 B1 12/2001 Frecska
6,421,235 B2 7/2002 Ditzik
6,437,685 B2 8/2002 Hanaki
6,456,253 B1 9/2002 Rummeli et al.
6,476,795 B1 11/2002 Derocher et al.
6,501,414 B2 12/2002 Amdt et al.
6,583,723 B2 6/2003 Watanabe et al.
6,597,897 B2 7/2003 Tang
6,615,074 B2 9/2003 Mickle et al.
6,650,376 B1 11/2003 Obitsu
6,664,920 B1 12/2003 Mott et al.
6,798,716 B1 9/2004 Charych
6,803,744 B1 10/2004 Sabo
6,856,291 B2 2/2005 Mickle et al.
6,911,945 B2 6/2005 Korva
6,960,968 B2 11/2005 Odendaal et al.
6,967,462 B1 11/2005 Landis
6,988,026 B2 1/2006 Breed et al.
7,003,350 B2 2/2006 Denker et al.
7,027,311 B2 4/2006 Vanderelli et al.
7,068,991 B2 6/2006 Parise
7,183,748 B1 2/2007 Unno et al.
7,191,013 B1 3/2007 Miranda et al.
7,196,663 B2 3/2007 Bolzer et al.
7,205,749 B2 4/2007 Hagen et al.
7,222,356 B1 5/2007 Yonezawa et al.
7,274,334 B2 9/2007 o'Riordan et al.
7,274,336 B2 9/2007 Carson
7,351,975 B2 4/2008 Brady et al.
7,359,730 B2 4/2008 Dennis et al.
7,392,068 B2 6/2008 Dayan
7,403,803 B2 7/2008 Mickle et al.
7,443,057 B2 10/2008 Nunally
7,451,839 B2 11/2008 Perlman
7,463,201 B2 12/2008 Chiang et al.
7,614,556 B2 11/2009 Overhultz et al.
7,639,994 B2 12/2009 Greene et al.
7,643,312 B2 1/2010 Vanderelli et al.
7,652,577 B1 1/2010 Madhow et al.
7,679,576 B2 3/2010 Riedel et al.
7,702,771 B2 4/2010 Ewing et al.
7,786,419 B2 8/2010 Hyde et al.
7,812,771 B2 10/2010 Greene et al.
7,830,312 B2 11/2010 Choudhury et al.
7,844,306 B2 11/2010 Shearer et al.
7,868,482 B2 1/2011 Greene et al.
7,898,105 B2 3/2011 Greene et al.
7,904,117 B2 3/2011 Doan et al.
7,925,308 B2 4/2011 Greene et al.
7,948,208 B2 5/2011 Partovi et al.
8,055,003 B2 11/2011 Mittleman et al.
8,070,595 B2 12/2011 Alderucci et al.
8,072,380 B2 12/2011 Crouch
8,092,301 B2 1/2012 Alderucci et al.
8,099,140 B2 1/2012 Arai
8,115,448 B2 2/2012 John
8,159,090 B2 4/2012 Greene et al.
8,159,364 B2 4/2012 Zeine
8,180,286 B2 5/2012 Yamasuge
8,228,194 B2 7/2012 Mickle
8,234,509 B2 7/2012 Gioscia et al.
8,264,101 B2 9/2012 Hyde et al.
8,264,291 B2 9/2012 Morita
8,276,325 B2 10/2012 Clifton et al.
8,278,784 B2 10/2012 Cook et al.
8,284,101 B2 10/2012 Fusco
8,310,201 B1 11/2012 Wright
8,338,991 B2 12/2012 Von Novak et al.
8,362,745 B2 1/2013 Tinaphong
8,380,255 B2 2/2013 Shearer et al.
8,410,953 B2 4/2013 Zeine
8,411,963 B2 4/2013 Luff
8,432,062 B2 4/2013 Greene et al.
8,432,071 B2 4/2013 Huang et al.
8,446,248 B2 5/2013 Zeine
8,447,234 B2 5/2013 Cook et al.
8,451,189 B1 5/2013 Fluhler
8,452,235 B2 5/2013 Kirby et al.
8,457,656 B2 6/2013 Perkins et al.
8,461,817 B2 6/2013 Martin et al.
8,467,733 B2 6/2013 Leabman
8,497,601 B2 7/2013 Hall et al.
8,497,658 B2 7/2013 Von Novak et al.
8,552,597 B2 8/2013 Song et al.
8,558,661 B2 10/2013 Zeine
8,560,026 B2 10/2013 Chanterac
8,604,746 B2 12/2013 Lee
8,614,643 B2 12/2013 Leabman
8,621,245 B2 12/2013 Shearer et al.
8,626,249 B2 1/2014 Kuusilinna et al.
8,629,576 B2 1/2014 Levine
8,653,966 B2 2/2014 Rao et al.
8,674,551 B2 3/2014 Low et al.
8,686,685 B2 4/2014 Moshfeghi
8,712,355 B2 4/2014 Black et al.
8,712,485 B2 4/2014 Tam
8,718,773 B2 5/2014 Willis et al.
8,729,737 B2 5/2014 Schatz et al.
8,736,228 B1 5/2014 Freed et al.
8,760,113 B2 6/2014 Keating
8,770,482 B2 7/2014 Ackermann et al.
8,772,960 B2 7/2014 Yoshida
8,823,319 B2 9/2014 Von Novak, III et al.
8,832,646 B1 9/2014 Wendling
8,854,176 B2 10/2014 Zeine
8,860,364 B2 10/2014 Low et al.
8,897,770 B1 11/2014 Frolov et al.
8,903,456 B2 12/2014 Chu et al.
8,917,057 B2 12/2014 Hui
8,923,189 B2 12/2014 Leabman
8,928,544 B2 1/2015 Massie et al.
8,937,408 B2 1/2015 Ganem et al.
8,946,940 B2 2/2015 Kim et al.
8,963,486 B2 2/2015 Kirby et al.
8,970,070 B2 3/2015 Sada et al.
8,989,053 B1 3/2015 Skaaksrud et al.

(56) References Cited

U.S. PATENT DOCUMENTS 9,000,616 B2 4/2015 Greene et al.
9,001,622 B2 4/2015 Perry
9,006,934 B2 4/2015 Kozakai et al.
9,021,277 B2 4/2015 Shearer et al.
9,030,161 B2 5/2015 Lu et al.
9,059,598 B2 6/2015 Kang et al.
9,059,599 B2 6/2015 Won et al.
9,077,188 B2 7/2015 Moshfeghi
9,083,595 B2 7/2015 Rakib et al.
9,088,216 B2 7/2015 Garrity et al.
9,124,125 B2 9/2015 Leabman et al.
9,130,397 B2 9/2015 Leabman et al.
9,130,602 B2 9/2015 Cook
9,142,998 B2 9/2015 Yu et al.
9,143,000 B2 9/2015 Leabman et al.
9,143,010 B2 9/2015 Urano
9,178,389 B2 11/2015 Hwang
9,225,196 B2 12/2015 Huang et al.
9,240,469 B2 1/2016 Sun et al.
9,242,411 B2 1/2016 Kritchman et al.
9,244,500 B2 1/2016 Cain et al.
9,252,628 B2 2/2016 Leabman et al.
9,270,344 B2 2/2016 Rosenberg
9,282,582 B1 3/2016 Dunsbergen et al.
9,294,840 B1 3/2016 Anderson et al.
9,297,896 B1 3/2016 Andrews
9,318,898 B2 4/2016 John
9,368,020 B1 6/2016 Bell et al.
9,401,977 B1 7/2016 Gaw
9,409,490 B2 8/2016 Kawashima
9,438,045 B1 9/2016 Leabman
9,438,046 B1 9/2016 Leabman
9,444,283 B2 9/2016 Son et al.
9,450,449 B1 9/2016 Leabman et al.
9,461,502 B2 10/2016 Lee et al.
9,520,725 B2 12/2016 Masaoka et al.
9,520,748 B2 12/2016 Hyde et al.
9,522,270 B2 12/2016 Perryman et al.
9,537,354 B2 1/2017 Bell et al.
9,537,357 B2 1/2017 Leabman
9,537,358 B2 1/2017 Leabman
9,538,382 B2 1/2017 Bell et al.
9,544,640 B2 1/2017 Lau
9,559,553 B2 1/2017 Bae
9,564,773 B2 2/2017 Pogorelik et al.
9,571,974 B2 2/2017 Choi et al.
9,590,317 B2 3/2017 Zimmerman et al.
9,590,444 B2 3/2017 Walley
9,620,996 B2 4/2017 Zeine
9,647,328 B2 5/2017 Dobric
9,711,999 B2 7/2017 Hietala et al.
9,723,635 B2 8/2017 Nambord et al.
9,793,758 B2 10/2017 Leabman
9,793,764 B2 10/2017 Perry
9,806,564 B2 10/2017 Leabman
9,819,230 B2 11/2017 Petras et al.
9,866,279 B2 1/2018 Bell et al.
2002/0001307 A1 1/2002 Nguyen et al.
2002/0024471 A1 2/2002 Ishitobi
2002/0028655 A1 3/2002 Rosener et al.
2002/0034958 A1 3/2002 Oberschmidt et al.
2002/0054330 A1 5/2002 Jinbo et al.
2002/0072784 A1 6/2002 Sheppard et al.
2002/0095980 A1 7/2002 Breed et al.
2002/0103447 A1 8/2002 Terry
2002/0133592 A1 9/2002 Matsuda
2002/0172223 A1 11/2002 Stilp
2003/0005759 A1 1/2003 Breed et al.
2003/0058187 A1 3/2003 Billiet et al.
2003/0076274 A1 4/2003 Phelan et al.
2003/0179152 A1 9/2003 Watada et al.
2003/0179573 A1 9/2003 Chun
2003/0192053 A1 10/2003 Sheppard et al.
2004/0019624 A1 1/2004 Sukegawa
2004/0020100 A1 2/2004 O'Brian et al.
2004/0036657 A1 2/2004 Forster et al.
2004/0066251 A1 4/2004 Eleftheriades et al.
2004/0107641 A1 6/2004 Walton et al.
2004/0113543 A1 6/2004 Daniels
2004/0119675 A1 6/2004 Washio et al.
2004/0130425 A1 7/2004 Dayan et al.
2004/0130442 A1 7/2004 Breed
2004/0142733 A1 7/2004 Parise
2004/0145342 A1 7/2004 Lyon
2004/0196190 A1 10/2004 Mendolia et al.
2004/0203979 A1 10/2004 Attar et al.
2004/0207559 A1 10/2004 Milosavljevic
2004/0218759 A1 11/2004 Yacobi
2004/0259604 A1 12/2004 Mickle et al.
2004/0263124 A1 12/2004 Wieck et al.
2005/0007276 A1 1/2005 Barrick et al.
2005/0030118 A1 2/2005 Wang
2005/0046584 A1 3/2005 Breed
2005/0055316 A1 3/2005 Williams
2005/0093766 A1 5/2005 Turner
2005/0116683 A1 6/2005 Cheng
2005/0117660 A1 6/2005 Vialle et al.
2005/0134517 A1 6/2005 Gottl
2005/0171411 A1 8/2005 KenKnight
2005/0198673 A1 9/2005 Kit et al.
2005/0227619 A1 10/2005 Lee et al.
2005/0232469 A1 10/2005 Schofield
2005/0237249 A1 10/2005 Nagel
2005/0237258 A1 10/2005 Abramov et al.
2005/0282591 A1 12/2005 Shaff
2006/0013335 A1 1/2006 Leabman
2006/0019712 A1 1/2006 Choi
2006/0030279 A1 2/2006 Leabman et al.
2006/0033674 A1 2/2006 Essig, Jr. et al.
2006/0071308 A1 4/2006 Tang et al.
2006/0092079 A1 5/2006 de Rochemont
2006/0094425 A1 5/2006 Mickle et al.
2006/0113955 A1 6/2006 Nunally
2006/0119532 A1 6/2006 Yun et al.
2006/0136004 A1 6/2006 Cowan et al.
2006/0160517 A1 7/2006 Yoon
2006/0183473 A1 8/2006 Ukon
2006/0190063 A1 8/2006 Kanzius
2006/0192913 A1 8/2006 Shutou et al.
2006/0199620 A1 9/2006 Greene et al.
2006/0238365 A1 10/2006 Vecchione et al.
2006/0266564 A1 11/2006 Perlman et al.
2006/0266917 A1 11/2006 Baldis et al.
2006/0278706 A1 12/2006 Hatakeyama et al.
2006/0284593 A1 12/2006 Nagy et al.
2006/0287094 A1 12/2006 Mahaffey et al.
2007/0007821 A1 1/2007 Rossetti
2007/0019693 A1 1/2007 Graham
2007/0021140 A1 1/2007 Keyes
2007/0060185 A1 3/2007 Simon et al.
2007/0070490 A1 3/2007 Tsunoda et al.
2007/0090997 A1 4/2007 Brown et al.
2007/0093269 A1 4/2007 Leabman et al.
2007/0097653 A1 5/2007 Gilliland et al.
2007/0103110 A1 5/2007 Sagoo
2007/0106894 A1 5/2007 Zhang
2007/0109121 A1 5/2007 Cohen
2007/0139000 A1 6/2007 Kozuma
2007/0149162 A1 6/2007 Greene et al.
2007/0173196 A1 7/2007 Gallic
2007/0173214 A1 7/2007 Mickle et al.
2007/0178857 A1 8/2007 Greene et al.
2007/0178945 A1 8/2007 Cook et al.
2007/0182367 A1 8/2007 Partovi
2007/0191074 A1 8/2007 Harrist et al.
2007/0191075 A1 8/2007 Greene et al.
2007/0197281 A1 8/2007 Stronach
2007/0210960 A1 9/2007 Rofougaran et al.
2007/0222681 A1 9/2007 Greene et al.
2007/0257634 A1 11/2007 Leschin et al.
2007/0273486 A1 11/2007 Shiotsu
2007/0296639 A1 12/2007 Hook et al.
2007/0298846 A1 12/2007 Greene et al.
2008/0014897 A1 1/2008 Cook et al.

(56) References Cited

U.S. PATENT DOCUMENTS

| | | | |
|---|---|---|---|
| 2008/0024376 | A1 | 1/2008 | Norris et al. |
| 2008/0062062 | A1 | 3/2008 | Borau et al. |
| 2008/0062255 | A1 | 3/2008 | Gal |
| 2008/0067874 | A1 | 3/2008 | Tseng |
| 2008/0074324 | A1 | 3/2008 | Puzella et al. |
| 2008/0089277 | A1 | 4/2008 | Alexander et al. |
| 2008/0110263 | A1 | 5/2008 | Klessel et al. |
| 2008/0113816 | A1 | 5/2008 | Mahaffey et al. |
| 2008/0122297 | A1 | 5/2008 | Arai |
| 2008/0123383 | A1 | 5/2008 | Shionoiri |
| 2008/0129536 | A1 | 6/2008 | Randall et al. |
| 2008/0140278 | A1 | 6/2008 | Breed |
| 2008/0169910 | A1 | 7/2008 | Greene et al. |
| 2008/0197802 | A1 | 8/2008 | Onishi |
| 2008/0204342 | A1 | 8/2008 | Kharadly |
| 2008/0204350 | A1 | 8/2008 | Tam et al. |
| 2008/0210762 | A1 | 9/2008 | Osada et al. |
| 2008/0211458 | A1 | 9/2008 | Lawther et al. |
| 2008/0233890 | A1 | 9/2008 | Baker |
| 2008/0248758 | A1 | 10/2008 | Schedelbeck et al. |
| 2008/0248846 | A1 | 10/2008 | Stronach et al. |
| 2008/0266191 | A1 | 10/2008 | Hilgers |
| 2008/0278378 | A1 | 11/2008 | Chang et al. |
| 2008/0309452 | A1 | 12/2008 | Zeine |
| 2009/0002493 | A1 | 1/2009 | Kates |
| 2009/0019183 | A1 | 1/2009 | Wu et al. |
| 2009/0036065 | A1 | 2/2009 | Siu |
| 2009/0047998 | A1 | 2/2009 | Alberth, Jr. |
| 2009/0058354 | A1 | 3/2009 | Harrison |
| 2009/0058361 | A1 | 3/2009 | John |
| 2009/0058731 | A1 | 3/2009 | Geary et al. |
| 2009/0067208 | A1 | 3/2009 | Martin et al. |
| 2009/0096412 | A1 | 4/2009 | Huang |
| 2009/0096413 | A1 | 4/2009 | Partovi |
| 2009/0102292 | A1 | 4/2009 | Cook et al. |
| 2009/0102296 | A1 | 4/2009 | Greene et al. |
| 2009/0108679 | A1 | 4/2009 | Porwal |
| 2009/0128262 | A1 | 5/2009 | Lee et al. |
| 2009/0157911 | A1 | 6/2009 | Aihara |
| 2009/0200985 | A1 | 8/2009 | Zane et al. |
| 2009/0206791 | A1 | 8/2009 | Jung |
| 2009/0207090 | A1 | 8/2009 | Pettus et al. |
| 2009/0207092 | A1 | 8/2009 | Nysen et al. |
| 2009/0218884 | A1 | 9/2009 | Soar |
| 2009/0218891 | A1 | 9/2009 | McCollough |
| 2009/0219903 | A1 | 9/2009 | Alamouti et al. |
| 2009/0243397 | A1 | 10/2009 | Cook et al. |
| 2009/0264069 | A1 | 10/2009 | Yamasuge |
| 2009/0280866 | A1 | 11/2009 | Lo et al. |
| 2009/0281678 | A1 | 11/2009 | Wakamatsu |
| 2009/0284082 | A1 | 11/2009 | Mohammadian |
| 2009/0284083 | A1 | 11/2009 | Karalis et al. |
| 2009/0284220 | A1 | 11/2009 | Toncich et al. |
| 2009/0284227 | A1 | 11/2009 | Mohammadian et al. |
| 2009/0284325 | A1 | 11/2009 | Rossiter et al. |
| 2009/0286475 | A1 | 11/2009 | Toncich et al. |
| 2009/0291634 | A1 | 11/2009 | Saarisalo |
| 2009/0299175 | A1 | 12/2009 | Bernstein et al. |
| 2009/0312046 | A1 | 12/2009 | Clevenger et al. |
| 2009/0315412 | A1 | 12/2009 | Yamamoto et al. |
| 2009/0322281 | A1 | 12/2009 | Kamijo et al. |
| 2010/0001683 | A1 | 1/2010 | Huang et al. |
| 2010/0007307 | A1 | 1/2010 | Baarman et al. |
| 2010/0007569 | A1 | 1/2010 | Sim et al. |
| 2010/0019686 | A1 | 1/2010 | Gutierrez, Jr. |
| 2010/0019908 | A1 | 1/2010 | Cho et al. |
| 2010/0026605 | A1 | 2/2010 | Yang et al. |
| 2010/0027379 | A1 | 2/2010 | Saulnier et al. |
| 2010/0029383 | A1 | 2/2010 | Dai |
| 2010/0033021 | A1 | 2/2010 | Bennett |
| 2010/0033390 | A1 | 2/2010 | Alamouti et al. |
| 2010/0041453 | A1 | 2/2010 | Grimm, Jr. |
| 2010/0044123 | A1 | 2/2010 | Perlman et al. |
| 2010/0054200 | A1 | 3/2010 | Tsai |
| 2010/0060534 | A1 | 3/2010 | Oodachi |
| 2010/0066631 | A1 | 3/2010 | Puzella et al. |
| 2010/0075607 | A1 | 3/2010 | Hosoya |
| 2010/0079005 | A1 | 4/2010 | Hyde et al. |
| 2010/0082193 | A1 | 4/2010 | Chiappetta |
| 2010/0087227 | A1 | 4/2010 | Francos et al. |
| 2010/0090524 | A1 | 4/2010 | Obayashi |
| 2010/0090656 | A1 | 4/2010 | Shearer et al. |
| 2010/0109443 | A1 | 5/2010 | Cook et al. |
| 2010/0117926 | A1 | 5/2010 | DeJean, II |
| 2010/0119234 | A1 | 5/2010 | Suematsu et al. |
| 2010/0123618 | A1 | 5/2010 | Martin et al. |
| 2010/0123624 | A1 | 5/2010 | Minear et al. |
| 2010/0127660 | A1 | 5/2010 | Cook et al. |
| 2010/0142418 | A1 | 6/2010 | Nishioka et al. |
| 2010/0142509 | A1 | 6/2010 | Zhu et al. |
| 2010/0148723 | A1 | 6/2010 | Cook et al. |
| 2010/0151808 | A1 | 6/2010 | Toncich et al. |
| 2010/0156721 | A1 | 6/2010 | Alamouti et al. |
| 2010/0156741 | A1 | 6/2010 | Vazquez et al. |
| 2010/0164296 | A1 | 7/2010 | Kurs et al. |
| 2010/0164433 | A1 | 7/2010 | Janefalker et al. |
| 2010/0171461 | A1 | 7/2010 | Baarman et al. |
| 2010/0174629 | A1 | 7/2010 | Taylor et al. |
| 2010/0176934 | A1 | 7/2010 | Chou et al. |
| 2010/0181961 | A1 | 7/2010 | Novak et al. |
| 2010/0181964 | A1 | 7/2010 | Huggins et al. |
| 2010/0194206 | A1 | 8/2010 | Burdo et al. |
| 2010/0201189 | A1 | 8/2010 | Kirby et al. |
| 2010/0201201 | A1 | 8/2010 | Mobarhan et al. |
| 2010/0201314 | A1 | 8/2010 | Toncich et al. |
| 2010/0207572 | A1 | 8/2010 | Kirby et al. |
| 2010/0210233 | A1 | 8/2010 | Cook et al. |
| 2010/0213895 | A1 | 8/2010 | Keating et al. |
| 2010/0214177 | A1 | 8/2010 | Parsche |
| 2010/0225270 | A1 | 9/2010 | Jacobs et al. |
| 2010/0227570 | A1 | 9/2010 | Hendin |
| 2010/0237709 | A1 | 9/2010 | Hall et al. |
| 2010/0244576 | A1 | 9/2010 | Hillan et al. |
| 2010/0256831 | A1 | 10/2010 | Abramo et al. |
| 2010/0259110 | A1 | 10/2010 | Kurs et al. |
| 2010/0259447 | A1 | 10/2010 | Crouch |
| 2010/0264747 | A1 | 10/2010 | Hall et al. |
| 2010/0277003 | A1 | 11/2010 | Von Novak et al. |
| 2010/0277121 | A1 | 11/2010 | Hall et al. |
| 2010/0279606 | A1 | 11/2010 | Hillan et al. |
| 2010/0289341 | A1 | 11/2010 | Ozaki et al. |
| 2010/0295372 | A1 | 11/2010 | Hyde et al. |
| 2010/0308767 | A1 | 12/2010 | Rofougaran et al. |
| 2010/0309079 | A1 | 12/2010 | Rofougaran et al. |
| 2010/0309088 | A1 | 12/2010 | Hyvonen et al. |
| 2010/0315045 | A1 | 12/2010 | Zeine |
| 2010/0316163 | A1 | 12/2010 | Forenza et al. |
| 2010/0327766 | A1 | 12/2010 | Recker et al. |
| 2010/0328044 | A1 | 12/2010 | Waffenschmidt et al. |
| 2010/0332401 | A1 | 12/2010 | Prahlad et al. |
| 2011/0013198 | A1 | 1/2011 | Shirley |
| 2011/0018360 | A1 | 1/2011 | Baarman et al. |
| 2011/0028114 | A1 | 2/2011 | Kerselaers |
| 2011/0031928 | A1 | 2/2011 | Soar |
| 2011/0032149 | A1 | 2/2011 | Leabman |
| 2011/0032866 | A1 | 2/2011 | Leabman |
| 2011/0034190 | A1 | 2/2011 | Leabman |
| 2011/0034191 | A1 | 2/2011 | Leabman |
| 2011/0043047 | A1 | 2/2011 | Karalis et al. |
| 2011/0043163 | A1 | 2/2011 | Baarman et al. |
| 2011/0043327 | A1 | 2/2011 | Baarman et al. |
| 2011/0050166 | A1 | 3/2011 | Cook et al. |
| 2011/0055037 | A1 | 3/2011 | Hayashigawa et al. |
| 2011/0056215 | A1 | 3/2011 | Ham |
| 2011/0057607 | A1 | 3/2011 | Carobolante |
| 2011/0062788 | A1 | 3/2011 | Chen et al. |
| 2011/0074342 | A1 | 3/2011 | MacLaughlin |
| 2011/0074349 | A1 | 3/2011 | Ghovanloo |
| 2011/0074620 | A1 | 3/2011 | Wintermantel |
| 2011/0078092 | A1 | 3/2011 | Kim et al. |
| 2011/0090126 | A1 | 4/2011 | Szini et al. |
| 2011/0109167 | A1 | 5/2011 | Park et al. |
| 2011/0114401 | A1 | 5/2011 | Kanno |
| 2011/0115303 | A1 | 5/2011 | Baarman et al. |

(56) References Cited

U.S. PATENT DOCUMENTS

2011/0115432 A1 5/2011 El-Maleh
2011/0115605 A1 5/2011 Dimig et al.
2011/0121660 A1 5/2011 Azancot et al.
2011/0122018 A1 5/2011 Tarng et al.
2011/0122026 A1 5/2011 DeLaquil et al.
2011/0127845 A1 6/2011 Walley et al.
2011/0127952 A1 6/2011 Walley et al.
2011/0133655 A1 6/2011 Recker et al.
2011/0133691 A1 6/2011 Hautanen
2011/0148578 A1 6/2011 Aloi et al.
2011/0151789 A1 6/2011 Viglione et al.
2011/0154429 A1 6/2011 Stantchev
2011/0156494 A1 6/2011 Mashinsky
2011/0156640 A1 6/2011 Moshfeghi
2011/0163128 A1 7/2011 Taguchi et al.
2011/0175455 A1 7/2011 Hashiguchi
2011/0175461 A1 7/2011 Tinaphong
2011/0181120 A1 7/2011 Liu et al.
2011/0182245 A1 7/2011 Malkamaki et al.
2011/0184842 A1 7/2011 Melen
2011/0188207 A1 8/2011 Won et al.
2011/0194543 A1 8/2011 Zhao et al.
2011/0195722 A1 8/2011 Walter et al.
2011/0199046 A1 8/2011 Tsai et al.
2011/0215086 A1 9/2011 Yeh
2011/0217923 A1 9/2011 Ma
2011/0220634 A1 9/2011 Yeh
2011/0221389 A1 9/2011 Won et al.
2011/0222272 A1 9/2011 Yeh
2011/0243040 A1 10/2011 Khan et al.
2011/0243050 A1 10/2011 Yanover
2011/0244913 A1 10/2011 Kim et al.
2011/0248573 A1 10/2011 Kanno et al.
2011/0248575 A1 10/2011 Kim et al.
2011/0249678 A1 10/2011 Bonicatto
2011/0254377 A1 10/2011 Widmer et al.
2011/0254503 A1 10/2011 Widmer et al.
2011/0259953 A1 10/2011 Baarman et al.
2011/0273977 A1 11/2011 Shapira et al.
2011/0278941 A1 11/2011 Krishna et al.
2011/0279226 A1 11/2011 Chen et al.
2011/0281535 A1 11/2011 Low et al.
2011/0282415 A1 11/2011 Eckhoff et al.
2011/0285213 A1 11/2011 Kowalewski
2011/0286374 A1 11/2011 Shin et al.
2011/0291489 A1 12/2011 Tsai et al.
2011/0302078 A1 12/2011 Failing
2011/0304216 A1 12/2011 Baarman
2011/0304437 A1 12/2011 Beeler
2011/0304521 A1 12/2011 Ando et al.
2012/0013196 A1 1/2012 Kim et al.
2012/0013198 A1 1/2012 Uramoto et al.
2012/0013296 A1 1/2012 Heydari et al.
2012/0019419 A1 1/2012 Prat et al.
2012/0043887 A1 2/2012 Mesibov
2012/0051109 A1 3/2012 Kim et al.
2012/0051294 A1 3/2012 Guillouard
2012/0056486 A1 3/2012 Endo et al.
2012/0056741 A1 3/2012 Zhu et al.
2012/0068906 A1 3/2012 Asher et al.
2012/0074891 A1 3/2012 Anderson et al.
2012/0231856 A1 3/2012 Lee et al.
2012/0080957 A1 4/2012 Cooper et al.
2012/0086284 A1 4/2012 Capanella et al.
2012/0095617 A1 4/2012 Martin et al.
2012/0098350 A1 4/2012 Campanella et al.
2012/0098485 A1 4/2012 Kang et al.
2012/0099675 A1 4/2012 Kitamura et al.
2012/0103562 A1 5/2012 Clayton
2012/0104849 A1 5/2012 Jackson
2012/0105252 A1 5/2012 Wang
2012/0112532 A1 5/2012 Kesler et al.
2012/0119914 A1 5/2012 Uchida
2012/0126743 A1 5/2012 Rivers, Jr.
2012/0132647 A1 5/2012 Beverly et al.
2012/0133214 A1 5/2012 Yun et al.
2012/0146426 A1 6/2012 Sabo
2012/0146576 A1 6/2012 Partovi
2012/0146577 A1 6/2012 Tanabe
2012/0147802 A1 6/2012 Ukita et al.
2012/0149307 A1 6/2012 Terada et al.
2012/0150670 A1 6/2012 Taylor et al.
2012/0153894 A1 6/2012 Widmer et al.
2012/0157019 A1 6/2012 Li
2012/0161531 A1 6/2012 Kim et al.
2012/0161544 A1 6/2012 Kashiwagi et al.
2012/0169276 A1 7/2012 Wang
2012/0169278 A1 7/2012 Choi
2012/0173418 A1 7/2012 Beardsmore et al.
2012/0181973 A1 7/2012 Lyden
2012/0182427 A1 7/2012 Marshall
2012/0187851 A1 8/2012 Huggins et al.
2012/0193999 A1 8/2012 Zeine
2012/0201153 A1 8/2012 Bharadia et al.
2012/0201173 A1 8/2012 Jain et al.
2012/0206299 A1 8/2012 Valdes-Garcia
2012/0212072 A1 8/2012 Miyabayashi et al.
2012/0214462 A1 8/2012 Chu et al.
2012/0214536 A1 8/2012 Kim et al.
2012/0200399 A1 9/2012 Chae
2012/0228956 A1 9/2012 Kamata
2012/0235636 A1 9/2012 Partovi
2012/0242283 A1 9/2012 Kim et al.
2012/0248886 A1 10/2012 Kesler et al.
2012/0248891 A1 10/2012 Drennen
2012/0249051 A1 10/2012 Son et al.
2012/0262002 A1 10/2012 Widmer et al.
2012/0267900 A1 10/2012 Huffman et al.
2012/0268238 A1 10/2012 Park et al.
2012/0274154 A1 11/2012 DeLuca
2012/0280650 A1 11/2012 Kim et al.
2012/0286582 A1 11/2012 Kim et al.
2012/0292993 A1 11/2012 Mettler et al.
2012/0293021 A1 11/2012 Teggatz et al.
2012/0293119 A1 11/2012 Park et al.
2012/0299389 A1 11/2012 Lee et al.
2012/0299540 A1 11/2012 Perry
2012/0299541 A1 11/2012 Perry
2012/0299542 A1 11/2012 Perry
2012/0300588 A1 11/2012 Perry
2012/0300592 A1 11/2012 Perry
2012/0300593 A1 11/2012 Perry
2012/0306705 A1 12/2012 Sakurai et al.
2012/0306707 A1 12/2012 Yang et al.
2012/0306720 A1 12/2012 Tanmi et al.
2012/0309295 A1 12/2012 Maguire
2012/0309308 A1 12/2012 Kim et al.
2012/0309332 A1 12/2012 Liao
2012/0313449 A1 12/2012 Kurs
2012/0326660 A1 12/2012 Lu et al.
2013/0002550 A1 1/2013 Zalewski
2013/0024059 A1 1/2013 Miller et al.
2013/0026981 A1 1/2013 Van Der Lee
2013/0026982 A1 1/2013 Rothenbaum
2013/0032589 A1 2/2013 Chung
2013/0033571 A1 2/2013 Steen
2013/0038124 A1 2/2013 Newdoll et al.
2013/0038402 A1 2/2013 Karalis et al.
2013/0043738 A1 2/2013 Park et al.
2013/0044035 A1 2/2013 Zhuang
2013/0049471 A1 2/2013 Oleynik
2013/0049475 A1 2/2013 Kim et al.
2013/0049484 A1 2/2013 Weissentern et al.
2013/0057078 A1 3/2013 Lee
2013/0057205 A1 3/2013 Lee et al.
2013/0057210 A1 3/2013 Nergaard et al.
2013/0057364 A1 3/2013 Kesler et al.
2013/0063082 A1 3/2013 Lee et al.
2013/0063143 A1 3/2013 Adalsteinsson et al.
2013/0069444 A1 3/2013 Waffenschmidt et al.
2013/0077650 A1 3/2013 Traxler et al.
2013/0078918 A1 3/2013 Crowley et al.
2013/0082651 A1 4/2013 Park et al.
2013/0082653 A1 4/2013 Lee et al.

(56) References Cited

U.S. PATENT DOCUMENTS

2013/0083774 A1 4/2013 Son et al.
2013/0088082 A1 4/2013 Kang et al.
2013/0088090 A1 4/2013 Wu
2013/0088192 A1 4/2013 Eaton
2013/0088331 A1 4/2013 Cho et al.
2013/0093388 A1 4/2013 Partovi
2013/0099389 A1 4/2013 Hong et al.
2013/0099586 A1 4/2013 Kato
2013/0106197 A1 5/2013 Bae et al.
2013/0107023 A1 5/2013 Tanaka et al.
2013/0119777 A1 5/2013 Rees
2013/0119929 A1 5/2013 Partovi
2013/0120217 A1 5/2013 Ueda et al.
2013/0132010 A1 5/2013 Winger et al.
2013/0134923 A1 5/2013 Smith
2013/0137455 A1 5/2013 Xia
2013/0141037 A1 6/2013 Jenwatanavet et al.
2013/0148341 A1 6/2013 Williams
2013/0149975 A1 6/2013 Yu et al.
2013/0154387 A1 6/2013 Lee et al.
2013/0155748 A1 6/2013 Sundstrom
2013/0157729 A1 6/2013 Tabe
2013/0169061 A1 7/2013 Miroshnichenko et al.
2013/0169219 A1 7/2013 Gray
2013/0169348 A1 7/2013 Shi
2013/0171939 A1 7/2013 Tian et al.
2013/0175877 A1 7/2013 Abe et al.
2013/0178253 A1 7/2013 Karaoguz
2013/0181881 A1 7/2013 Christie et al.
2013/0190031 A1 7/2013 Persson et al.
2013/0193769 A1 8/2013 Mehta et al.
2013/0197320 A1 8/2013 Albert et al.
2013/0200064 A1 8/2013 Clayton
2013/0207477 A1 8/2013 Nam et al.
2013/0207604 A1 8/2013 Zeine
2013/0207879 A1 8/2013 Rada et al.
2013/0210357 A1 8/2013 Qin et al.
2013/0221757 A1 8/2013 Cho et al.
2013/0234530 A1 9/2013 Miyauchi
2013/0234536 A1 9/2013 Chemishkian et al.
2013/0234658 A1 9/2013 Endo et al.
2013/0241306 A1 9/2013 Aber et al.
2013/0241468 A1 9/2013 Moshfeghi
2013/0241474 A1 9/2013 Moshfeghi
2013/0249478 A1 9/2013 Hirano
2013/0249479 A1 9/2013 Partovi
2013/0254578 A1 9/2013 Huang et al.
2013/0264997 A1 10/2013 Lee et al.
2013/0268782 A1 10/2013 Tam et al.
2013/0270923 A1 10/2013 Cook et al.
2013/0278209 A1 10/2013 Von Novak
2013/0285477 A1 10/2013 Lo et al.
2013/0285606 A1 10/2013 Ben-Shalom et al.
2013/0288600 A1 10/2013 Kuusilinna et al.
2013/0293423 A1 11/2013 Moshfeghi
2013/0307751 A1 11/2013 Yu-Juin et al.
2013/0310020 A1 11/2013 Kazuhiro
2013/0311798 A1 11/2013 Sultenfuss
2013/0328417 A1 12/2013 Takeuchi
2013/0334883 A1 12/2013 Kim et al.
2013/0339108 A1 12/2013 Ryder et al.
2013/0343251 A1 12/2013 Zhang
2014/0001846 A1 1/2014 Mosebrook
2014/0001875 A1 1/2014 Nahidipour
2014/0001876 A1 1/2014 Fujiwara et al.
2014/0006017 A1 1/2014 Sen
2014/0008992 A1 1/2014 Leabman
2014/0008993 A1 1/2014 Leabman
2014/0009108 A1 1/2014 Leabman
2014/0009110 A1 1/2014 Lee
2014/0011531 A1 1/2014 Burstrom et al.
2014/0015336 A1 1/2014 Weber et al.
2014/0015344 A1 1/2014 Mohamadi
2014/0021907 A1 1/2014 Yun et al.
2014/0021908 A1 1/2014 McCool
2014/0035524 A1 2/2014 Zeine
2014/0035526 A1 2/2014 Tripathi et al.
2014/0035786 A1 2/2014 Ley
2014/0049422 A1 2/2014 Von Novak et al.
2014/0055098 A1 2/2014 Lee et al.
2014/0057618 A1 2/2014 Zirwas et al.
2014/0062395 A1 3/2014 Kwon et al.
2014/0082435 A1 3/2014 Kitagawa
2014/0086125 A1 3/2014 Polo et al.
2014/0086592 A1 3/2014 Nakahara et al.
2014/0091756 A1 4/2014 Ofstein et al.
2014/0091968 A1 4/2014 Harel et al.
2014/0111147 A1 4/2014 Soar
2014/0113689 A1 4/2014 Lee
2014/0117946 A1 5/2014 Muller et al.
2014/0118140 A1 5/2014 Amis
2014/0128107 A1 5/2014 An
2014/0132210 A1 5/2014 Partovi
2014/0133279 A1 5/2014 Khuri-Yakub
2014/0139034 A1 5/2014 Sankar et al.
2014/0139039 A1 5/2014 Cook et al.
2014/0139180 A1 5/2014 Kim et al.
2014/0141838 A1 5/2014 Cai et al.
2014/0142876 A1 5/2014 John et al.
2014/0143933 A1 5/2014 Low et al.
2014/0145879 A1 5/2014 Pan
2014/0145884 A1 5/2014 Dang et al.
2014/0152117 A1 6/2014 Sanker
2014/0159651 A1 6/2014 Von Novak et al.
2014/0159652 A1 6/2014 Hall et al.
2014/0159662 A1 6/2014 Furui
2014/0159667 A1 6/2014 Kim et al.
2014/0169385 A1 6/2014 Hadani et al.
2014/0175893 A1 6/2014 Sengupta et al.
2014/0176054 A1 6/2014 Porat et al.
2014/0176061 A1 6/2014 Cheatham, III et al.
2014/0177399 A1 6/2014 Teng et al.
2014/0184148 A1 7/2014 Van Der Lee et al.
2014/0184155 A1 7/2014 Cha
2014/0184163 A1 7/2014 Das et al.
2014/0184170 A1 7/2014 Jeong
2014/0191568 A1 7/2014 Partovi
2014/0194092 A1 7/2014 Wanstedt et al.
2014/0194095 A1 7/2014 Wanstedt et al.
2014/0206384 A1 7/2014 Kim et al.
2014/0210281 A1 7/2014 Ito et al.
2014/0217967 A1 8/2014 Zeine et al.
2014/0225805 A1 8/2014 Pan et al.
2014/0232320 A1 8/2014 Ento July et al.
2014/0232610 A1 8/2014 Shigemoto et al.
2014/0239733 A1 8/2014 Mach et al.
2014/0241231 A1 8/2014 Zeine
2014/0245036 A1 8/2014 Oishi
2014/0246416 A1 9/2014 White
2014/0247152 A1 9/2014 Proud
2014/0252813 A1 9/2014 Lee et al.
2014/0252866 A1 9/2014 Walsh et al.
2014/0265725 A1 9/2014 Angle et al.
2014/0265727 A1 9/2014 Berte
2014/0265943 A1 9/2014 Angle et al.
2014/0266025 A1 9/2014 Jakubowski
2014/0273892 A1 9/2014 Nourbakhsh
2014/0281655 A1 9/2014 Angle et al.
2014/0292090 A1 10/2014 Cordeiro et al.
2014/0300452 A1 10/2014 Rofe et al.
2014/0312706 A1 10/2014 Fiorello et al.
2014/0325218 A1 10/2014 Shimizu et al.
2014/0327320 A1 11/2014 Muhs et al.
2014/0327390 A1 11/2014 Park et al.
2014/0346860 A1 11/2014 Aubry et al.
2014/0354063 A1 12/2014 Leabman et al.
2014/0354221 A1 12/2014 Leabman et al.
2014/0355718 A1 12/2014 Guan et al.
2014/0357309 A1 12/2014 Leabman et al.
2014/0368048 A1 12/2014 Leabman
2014/0368161 A1 12/2014 Leabman et al.
2014/0368405 A1 12/2014 Ek et al.
2014/0375139 A1 12/2014 Tsukamoto
2014/0375253 A1 12/2014 Leabman et al.

(56) References Cited

U.S. PATENT DOCUMENTS

2014/0375255 A1 12/2014 Leabman et al.
2014/0375258 A1 12/2014 Arkhipenkov
2014/0375261 A1 12/2014 Manova-Elssibony et al.
2014/0376646 A1 12/2014 Leabman et al.
2015/0001949 A1 1/2015 Leabman et al.
2015/0002086 A1 1/2015 Matos et al.
2015/0003207 A1 1/2015 Lee et al.
2015/0008980 A1 1/2015 Kim et al.
2015/0011160 A1 1/2015 Uurgovan et al.
2015/0015180 A1 1/2015 Miller et al.
2015/0015182 A1 1/2015 Brandtman et al.
2015/0015192 A1 1/2015 Leabamn
2015/0015194 A1 1/2015 Leabman et al.
2015/0015195 A1 1/2015 Leabman et al.
2015/0021990 A1 1/2015 Myer et al.
2015/0022008 A1 1/2015 Leabman et al.
2015/0022009 A1 1/2015 Leabman et al.
2015/0022010 A1 1/2015 Leabman et al.
2015/0023204 A1 1/2015 Wil et al.
2015/0028688 A1 1/2015 Masaoka
2015/0028694 A1 1/2015 Leabman et al.
2015/0028697 A1 1/2015 Leabman et al.
2015/0028875 A1 1/2015 Irie et al.
2015/0029397 A1 1/2015 Leabman et al.
2015/0035378 A1 2/2015 Calhoun et al.
2015/0035715 A1 2/2015 Kim et al.
2015/0041459 A1 2/2015 Leabman et al.
2015/0042264 A1 2/2015 Leabman et al.
2015/0042265 A1 2/2015 Leabman et al.
2015/0044977 A1 2/2015 Ramasamy et al.
2015/0046526 A1 2/2015 Bush et al.
2015/0061404 A1 3/2015 Lamenza et al.
2015/0076917 A1 3/2015 Leabman et al.
2015/0076927 A1 3/2015 Leabman et al.
2015/0077036 A1 3/2015 Leabman et al.
2015/0077037 A1 3/2015 Leabman et al.
2015/0091520 A1 4/2015 Blum et al.
2015/0091706 A1 4/2015 Chemishkian et al.
2015/0097663 A1 4/2015 Sloo et al.
2015/0102681 A1 4/2015 Leabman et al.
2015/0102764 A1 4/2015 Leabman et al.
2015/0102769 A1 4/2015 Leabman et al.
2015/0102973 A1 4/2015 Hand et al.
2015/0108848 A1 4/2015 Joehren
2015/0109181 A1 4/2015 Hyde et al.
2015/0115877 A1 4/2015 Aria et al.
2015/0115878 A1 4/2015 Park
2015/0123483 A1 5/2015 Leabman et al.
2015/0123496 A1 5/2015 Leabman et al.
2015/0128733 A1 5/2015 Taylor et al.
2015/0130285 A1 5/2015 Leabman et al.
2015/0130293 A1 5/2015 Hajimiri et al.
2015/0148664 A1 5/2015 Stolka et al.
2015/0155737 A1 6/2015 Mayo
2015/0155738 A1 6/2015 Leabman et al.
2015/0162751 A1 6/2015 Leabman et al.
2015/0162779 A1 6/2015 Lee et al.
2015/0171513 A1 6/2015 Chen et al.
2015/0171656 A1* 6/2015 Leabman ................ H02J 7/025
320/108
2015/0171658 A1 6/2015 Manova-Elssibony et al.
2015/0171931 A1 6/2015 Won et al.
2015/0177326 A1 6/2015 Chakraborty et al.
2015/0188352 A1 7/2015 Peek et al.
2015/0199665 A1 7/2015 Chu
2015/0207333 A1 7/2015 Baarman et al.
2015/0207542 A1 7/2015 Zeine
2015/0222126 A1 8/2015 Leabman et al.
2015/0236520 A1 8/2015 Baarman
2015/0244070 A1 8/2015 Cheng et al.
2015/0244187 A1 8/2015 Horie
2015/0244201 A1 8/2015 Chu
2015/0244341 A1 8/2015 Ritter et al.
2015/0249484 A1 9/2015 Mach et al.
2015/0255989 A1 9/2015 Walley et al.
2015/0263534 A1 9/2015 Lee et al.
2015/0263548 A1 9/2015 Cooper
2015/0270741 A1 9/2015 Leabman et al.
2015/0280484 A1 10/2015 Radziemski et al.
2015/0288438 A1 10/2015 Maltsev et al.
2015/0312721 A1 10/2015 Singh
2015/0318729 A1 11/2015 Leabman
2015/0326024 A1 11/2015 Bell et al.
2015/0326025 A1 11/2015 Bell et al.
2015/0326063 A1 11/2015 Leabman et al.
2015/0326068 A1 11/2015 Bell et al.
2015/0326069 A1 11/2015 Petras et al.
2015/0326070 A1 11/2015 Petras et al.
2015/0326072 A1 11/2015 Petras et al.
2015/0326142 A1 11/2015 Petras et al.
2015/0326143 A1 11/2015 Petras et al.
2015/0327085 A1 11/2015 Hadani
2015/0333528 A1 11/2015 Leabman
2015/0333529 A1 11/2015 Leabman
2015/0333573 A1 11/2015 Leabman
2015/0333800 A1 11/2015 Perry et al.
2015/0340759 A1 11/2015 Bridgelall et al.
2015/0340903 A1 11/2015 Bell et al.
2015/0340909 A1 11/2015 Bell et al.
2015/0340910 A1 11/2015 Petras et al.
2015/0340911 A1 11/2015 Bell et al.
2015/0341087 A1 11/2015 Moore et al.
2015/0349574 A1 12/2015 Leabman
2015/0358222 A1 12/2015 Berger et al.
2015/0365137 A1 12/2015 Miller et al.
2015/0365138 A1 12/2015 Miller et al.
2016/0005068 A1 1/2016 Im et al.
2016/0012695 A1 1/2016 Bell et al.
2016/0013656 A1 1/2016 Bell et al.
2016/0013677 A1 1/2016 Bell et al.
2016/0013678 A1 1/2016 Bell et al.
2016/0013855 A1 1/2016 Campos
2016/0020636 A1 1/2016 Khlat
2016/0020649 A1 1/2016 Bell et al.
2016/0020830 A1 1/2016 Bell et al.
2016/0042206 A1 2/2016 Pesavento et al.
2016/0054395 A1 2/2016 Bell et al.
2016/0054396 A1 2/2016 Bell et al.
2016/0054440 A1 2/2016 Younis
2016/0056635 A1 2/2016 Bell
2016/0056640 A1 2/2016 Mao
2016/0056669 A1 2/2016 Bell
2016/0056966 A1 2/2016 Bell
2016/0065005 A1 3/2016 Won et al.
2016/0079799 A1 3/2016 Khlat
2016/0094091 A1 3/2016 Shin et al.
2016/0094092 A1 3/2016 Davlantes et al.
2016/0099601 A1 4/2016 Leabman et al.
2016/0099602 A1 4/2016 Leabman et al.
2016/0099609 A1 4/2016 Leabman et al.
2016/0099610 A1 4/2016 Leabman et al.
2016/0099611 A1 4/2016 Leabman et al.
2016/0099612 A1 4/2016 Leabman et al.
2016/0099613 A1 4/2016 Leabman et al.
2016/0099614 A1 4/2016 Leabman et al.
2016/0099755 A1 4/2016 Leabman et al.
2016/0099756 A1 4/2016 Leabman et al.
2016/0099757 A1 4/2016 Leabman et al.
2016/0099758 A1 4/2016 Leabman et al.
2016/0100124 A1 4/2016 Leabman et al.
2016/0100312 A1 4/2016 Bell et al.
2016/0126752 A1 5/2016 Vuori et al.
2016/0126776 A1 5/2016 Kim et al.
2016/0141908 A1 5/2016 Jakl et al.
2016/0164563 A1 6/2016 Khawand et al.
2016/0181849 A1 6/2016 Govindaraj
2016/0181854 A1 6/2016 Leabman
2016/0181867 A1 6/2016 Daniel et al.
2016/0181873 A1 6/2016 Mitcheson et al.
2016/0191121 A1 6/2016 Bell
2016/0204622 A1 7/2016 Leabman
2016/0204642 A1 7/2016 Oh
2016/0238365 A1 8/2016 Wixey et al.
2016/0299210 A1 10/2016 Zeine

(56) References Cited

U.S. PATENT DOCUMENTS

| | | | |
|---|---|---|---|
| 2016/0323000 | A1 | 11/2016 | Liu et al. |
| 2016/0336804 | A1 | 11/2016 | Son et al. |
| 2016/0339258 | A1 | 11/2016 | Perryman et al. |
| 2016/0359367 | A1 | 12/2016 | Rothschild |
| 2016/0380464 | A1 | 12/2016 | Chin et al. |
| 2017/0005481 | A1 | 1/2017 | Von Novak, III |
| 2017/0005516 | A9 | 1/2017 | Leabman et al. |
| 2017/0005524 | A1 | 1/2017 | Akuzawa et al. |
| 2017/0005530 | A1 | 1/2017 | Zeine et al. |
| 2017/0025903 | A1 | 1/2017 | Song et al. |
| 2017/0026087 | A1 | 1/2017 | Tanabe |
| 2017/0043675 | A1 | 2/2017 | Jones et al. |
| 2017/0047784 | A1 | 2/2017 | Jung et al. |
| 2017/0077735 | A1 | 3/2017 | Leabman |
| 2017/0077736 | A1 | 3/2017 | Leabman |
| 2017/0077764 | A1 | 3/2017 | Bell et al. |
| 2017/0077765 | A1 | 3/2017 | Bell et al. |
| 2017/0077995 | A1 | 3/2017 | Leabman |
| 2017/0085120 | A1 | 3/2017 | Leabman et al. |
| 2017/0085437 | A1 | 3/2017 | Condeixa et al. |
| 2017/0092115 | A1 | 3/2017 | Sloo et al. |
| 2017/0110887 | A1 | 4/2017 | Bell et al. |
| 2017/0110914 | A1 | 4/2017 | Bell |
| 2017/0134686 | A9 | 5/2017 | Leabman |
| 2017/0163076 | A1 | 6/2017 | Park et al. |
| 2017/0179763 | A9 | 6/2017 | Leabman |

FOREIGN PATENT DOCUMENTS

| | | | |
|---|---|---|---|
| DE | 2000216655 | U1 | 2/2002 |
| EP | 1028482 | A2 | 8/2000 |
| EP | 1081506 | A1 | 3/2001 |
| EP | 2397973 | A1 | 6/2010 |
| EP | 2346136 | A1 | 7/2011 |
| EP | 2545635 | | 9/2011 |
| GB | 2404497 | A | 2/2005 |
| JP | 2006157586 | A | 6/2006 |
| JP | 2007043432 | A | 2/2007 |
| JP | 2008167017 | A | 7/2008 |
| KR | 20060061776 | A | 6/2006 |
| KR | 20070044302 | A | 4/2007 |
| KR | 100755144 | B1 | 9/2007 |
| KR | 20110132059 | A | 12/2011 |
| KR | 20110135540 | A1 | 12/2011 |
| KR | 20120009843 | A | 2/2012 |
| KR | 20120108759 | A | 10/2012 |
| KR | 1020130026977 | A | 3/2013 |
| WO | 9952173 | A2 | 10/1999 |
| WO | WO 200111716 | A1 | 2/2001 |
| WO | 2004077550 | A1 | 9/2004 |
| WO | 2003091943 | A1 | 11/2006 |
| WO | WO 2006122783 | | 11/2006 |
| WO | 2008156571 | A2 | 12/2008 |
| WO | 2010022181 | A1 | 2/2010 |
| WO | WO 2010039246 | A1 | 4/2010 |
| WO | 2010138994 | A1 | 12/2010 |
| WO | 2011112022 | A2 | 9/2011 |
| WO | WO 2012177283 | A1 | 12/2012 |
| WO | 2013/031988 | A1 | 3/2013 |
| WO | 2013035190 | A1 | 3/2013 |
| WO | WO 2013038074 | A2 | 3/2013 |
| WO | WO 2013042399 | A1 | 3/2013 |
| WO | WO 2013052950 | A1 | 4/2013 |
| WO | WO 2013105920 | A2 | 7/2013 |
| WO | WO 2014075103 | A1 | 5/2014 |
| WO | 2014132258 | A1 | 9/2014 |
| WO | 2014182788 | A2 | 11/2014 |
| WO | 2014182788 | A3 | 11/2014 |
| WO | WO 2014197472 | A1 | 12/2014 |
| WO | WO 2014209587 | A1 | 12/2014 |
| WO | WO 2015038773 | A1 | 3/2015 |
| WO | WO 2015097809 | A1 | 7/2015 |
| WO | WO 2015161323 | A1 | 10/2015 |
| WO | WO 2016048512 | A1 | 3/2016 |
| WO | WO 2016187357 | A1 | 11/2016 |

OTHER PUBLICATIONS

Energous Corp., IPRP, PCT/US2014/037170, dated Nov. 15, 2015, 8 pgs.

Energous Corp., Written Opinion, PCT/US2014/041534, dated Oct. 13, 2014, 6 pgs.

Energous Corp., IPRP, PCT/US2014/041534, dated Dec. 29, 2015, 7 pgs.

Energous Corp., IPRP, PCT/US2014/046956, dated Jan. 19, 2016 7 pgs.

Energous Corp., Written Opinion, PCT/US2014/037072 dated Sep. 12, 2014, 5 pgs.

Energous Corp., IPRP, PCT/US2014/037072, dated Nov. 10, 2015, 6 pgs.

Energous Corp., ISRWO, PCT/US2014/068568, dated Mar. 20, 2015, 10 pgs.

Energous Corp., IPRP, PCT/US2014/068568, dated Jun. 14, 2016, 8 pgs.

Energous Corp., IPRP, PCT/US2014/055195, dated Mar. 22, 2016, 9 pgs.

Energous Corp., IPRP, PCT/US2015/067291, dated Jul. 4, 2017, 4 pgs.

Energous Corp., IPRP, PCT/US2015/067242, dated Jun. 27, 2017, 7 pgs.

Energous Corp., ISRWO, PCT/US2015/067243, dated Mar. 10, 2016, 11 pgs.

Energous Corp., IPRP, PCT/US2015/067243, dated Jun. 27, 2017, 7 pgs.

Energous Corp., IPRP, PCT/US2014/037109, dated Apr. 12, 2016, 9 pgs.

Energous Corp., IPRP, PCT/US2015/067275, dated Jul. 4, 2017, 7 pgs.

Energous Corp., IPRP, PCT/US2015/067245, dated Jun. 27, 2017, 7 pgs.

Energous Corp., ISRWO, PCT/US2014/041546, dated Oct. 16, 2014, 12 pgs.

Energous Corp., IPRP, PCT/US2014/041546 dated Dec. 29, 2015, 9 pgs.

Energous Corp., IPRP, PCT/US2015/67250, dated Mar. 30, 2016, 10 pgs.

Energous Corp., ISRWO, PCT/US2015/067325, dated Mar. 10, 2016, 9 pgs.

Energous Corp., IPRP, PCT/US2015/067325, dated Jul. 4, 2017, 8 pgs.

Energous Corp., ISRWO, PCT/US2014/040697, dated Oct. 1, 2014, 12 pgs.

Energous Corp., IPRP, PCT/US2014/040697, dated Dec. 8, 2015, 9 pgs.

Energous Corp., ISRWO, PCT/US2014/040705, dated Sep. 23, 2014, 8 pgs.

Energous Corp., IPRP, PCT/US2014/040705, dated Dec. 8, 2015, 6 pgs.

Energous Corp., ISRWO, PCT/US2015/067249, dated Mar. 29, 2016, 8 pgs.

Energous Corp., IPRP, PCT/US2015/067249, dated Jun. 27, 2017, 7 pgs.

Energous Corp., ISRWO, PCT/US2015/067246, dated May 11, 2016, 18 pgs.

Energous Corp., IPRP, PCT/US2015/067246, dated Jun. 27, 2017, 9 pgs.

Energous Corp., ISRWO, PCT/US2014/059317, dated Feb. 24, 2015, 13 pgs.

Energous Corp., IPRP, PCT/US2014/059317, dated Apr. 12, 2016, 10 pgs.

Energous Corp., ISRWO, PCT/US2014/049669, dated Nov. 13, 2014, 10 pgs.

Energous Corp., IPRP, PCT/US2014/049669, dated Feb. 9, 2016, 8 pgs.

Energous Corp., ISRWO, PCT/US2014/041323, dated Oct. 1, 2014, 10 pgs.

Energous Corp., IPRP, PCT/US2014/041323, dated Dec. 22, 2015, 8 pgs.

(56) References Cited

OTHER PUBLICATIONS

Energous Corp., ISRWO, PCT/US2014/048002, dated Nov. 13, 2014, 11 pgs.
Energous Corp., IPRP, PCT/US2014/048002, dated Feb. 12, 2015, 8 pgs.
Energous Corp., ISRWO, PCT/US2014/062682, dated Feb. 12, 2015, 10 pgs.
Energous Corp., IPRP, PCT/US2014/062682, dated May 3, 2016, 8 pgs.
Energous Corp., ISRWO, PCT/US2014/049666, dated Nov. 10, 2014, 7 pgs.
Energous Corp., IPRP, PCT/US2014/049666, dated Feb. 9, 2016, 5 pgs.
Energous Corp., ISRWO, PCT/US2014/046961, dated Nov. 24, 2014, 16 pgs.
Energous Corp., IPRP, PCT/US2014/046961, dated Jan. 19, 2016, 8 pgs.
Energous Corp., ISRWO, PCT/US2015/067279, dated Mar. 11, 2015, 13 pgs.
Energous Corp., IPRP, PCT/US2015/067279, dated Jul. 4, 2017, 7 pgs.
Energous Corp., ISRWO, PCT/US2014/041342, dated Jan. 27, 2015, 10 pgs.
Energous Corp., IPRP, PCT/US2014/041342, dated Dec. 15, 2015, 8 pgs.
Energous Corp., ISRWO, PCT/US2014/046941, dated Nov. 6, 2014, 11 pgs.
Energous Corp., IPRP, PCT/US2014/046941, dated Jan. 19, 2016, 9 pgs.
Energous Corp., ISRWO, PCT/US2014/062661, dated Jan. 27, 2015, 12 pgs.
Energous Corp., IPRP, PCT/US2014/062661, dated May 3, 2016, 10 pgs.
Energous Corp., ISRWO, PCT/US2014/059871, dated Jan. 23, 2015, 12 pgs.
Energous Corp., IPRP, PCT/US2014/059871, dated Apr. 12, 2016, 9 pgs.
Energous Corp., ISRWO, PCT/US2014/045102, dated Oct. 28, 2014, 14 pgs.
Energous Corp., IPRP, PCT/US2014/045102, dated Jan. 12, 2016, 11 pgs.
Energous Corp., ISRWO, PCT/US2014/059340, dated Jan. 15, 2015, 13 pgs.
Energous Corp., IPRP, PCT/US2014/059340, dated Apr. 12, 2016, 11 pgs.
Energous Corp., ISRWO, PCT/US2015/067282, dated Jul. 5, 2016, 7 pgs.
Energous Corp., IPRP, PCT/US2015/067282, dated Jul. 4, 2017, 6 pgs.
Energous Corp., ISRWO, PCT/US2014/041558, dated Oct. 10, 2014, 8 pgs.
Energous Corp., IPRP, PCT/US2014/041558, dated Dec. 29, 2015, 65 pgs.
Energous Corp., ISRWO, PCT/US2014/045119, dated Oct. 13, 2014, 11 pgs.
Energous Corp., IPRP, PCT/US2014/045119, dated Jan. 12, 2016, 9 pgs.
Energous Corp., ISRWO, PCT/US2014/045237, dated Oct. 13, 2014, 16 pgs.
Energous Corp., IPRP, PCT/US2014/045237, dated Jan. 12, 2016, 12 pgs.
Energous Corp., ISRWO, PCT/US2014/054897, dated Feb. 17, 2015, 10 pgs.
Energous Corp., IPRP, PCT/US2014/054897, dated Mar. 15, 2016, 8 pgs.
Energous Corp., ISRWO, PCT/US2015/067334, dated Mar. 3, 2016, 6 pgs.
Energous Corp., IPRP, PCT/US2015/067334, dated Jul. 4, 2017, 5 pgs.
Energous Corp., ISRWO, PCT/US2014/047963, dated Nov. 7, 2014, 13 pgs.
Energous Corp., IPRP, PCT/US2014/047963, dated Jan. 26, 2016, 10 pgs.
Energous Corp., ISRWO , PCT/US2014/054891, dated Dec. 18, 2014, 12 pgs.
Energous Corp., IPRP, PCT/US2014/054891, dated Mar. 15, 2016, 10 pgs.
Energous Corp., ISRWO, PCT/US2014/054953, dated Dec. 4, 2014, 7 pgs.
Energous Corp., IPRP, PCT/US2014/054953, dated Mar. 22, 2016, 5 pgs.
Energous Corp., ISRWO , PCT/US2015/067294, dated Mar. 29, 2016, 7 pgs.
Energous Corp., IPRP , PCT/US2015/067294, dated Jul. 4, 2017, 6 pgs.
Energous Corp., ISRWO , PCT/US2014/062672 dated Jan. 26, 2015, 11 pgs.
Energous Corp., IPRP , PCT/US2014/062672 dated May 10, 2016, 8 pgs.
Energous Corp., ISRWO , PCT/US2014/044810 dated Oct. 21, 2014, 12 pgs.
Energous Corp., IPRP , PCT/US2014/044810, dated Jan. 5, 2016, 10 pgs.
Energous Corp., ISRWO , PCT/US2015/067271, dated Mar. 11, 2016, 6 pgs.
Energous Corp., IPRP , PCT/US2015/067271, dated Jul. 4, 2017, 5 pgs.
Energous Corp., ISRWO , PCT/US2014/040648, dated Oct. 10, 2014, 11 pgs.
Energous Corp., IPRP , PCT/US2014/040608, dated Dec. 8, 2015, 8 pgs.
Energous Corp., ISRWO , PCT/US2014/049673, dated Nov. 18, 2014, 10 pgs.
Energous Corp., IPRP , PCT/US2014/049673, dated Feb. 9, 2016, 6 pgs.
Energous Corp., ISRWO , PCT/US2014/068282, dated Mar. 19, 2015, 13 pgs.
Energous Corp., IPRP, PCT/US2014/068282, dated Jun. 7, 2016, 10 pgs.
Energous Corp., ISRWO, PCT/US2014/068586, dated Mar. 20, 2015, 11 pgs.
Energous Corp., IPRP, PCT/US2014/068586, dated Jun. 14, 2016, 8 pgs.
Energous Corp., ISRWO, PCT/US2016/068504, dated Mar. 30, 2017, 8 pgs.
Energous Corp., ISRWO, PCT/US2016/068495, dated Mar. 30, 2017, 9 pgs.
Energous Corp., IPRP, PCT/US2015/067287, dated Jul. 4, 2017, 6 pgs.
Energous Corp., ISRWO, PCT/US2016/068551, dated Mar. 17, 2017, 8 pgs.
Energous Corp., ISRWO, PCT/US2016/068498, dated May 17, 2017, 8 pgs.
Energous Corp., ISRWO, PCT/US2016/068993, dated Mar. 13, 2017, 12 pgs.
Energous Corp., ISRWO, PCT/US2016/068565, dated Mar. 8, 2017, 11 pgs.
Energous Corp., ISRWO, PCT/US2016/068987, dated May 8, 2017, 10 pgs.
Energous Corp., ISRWO, PCT/US2016/069316, dated Mar. 16, 2017, 15 pgs.
Supplementary European Search Report, EP Patent Application No. EP14818136-5, dated Jul. 21, 2016, 9 pgs.
European Search Report, EP Patent Application No. EP16189052.0, dated Jan. 31, 2017, 11 pgs.
European Search Report, EP Patent Application No. EP16189319-3, dated Feb. 1, 2017, 9 pgs.
European Search Report, EP Patent Application No. EP14822971, dated Feb. 1, 2017, 9 pgs.
European Search Report, EP Patent Application No. EP16189987, dated Feb. 1, 2017, 8 pgs.

(56) References Cited

OTHER PUBLICATIONS

European Search Report, EP Patent Application No. 16196205.5, dated Mar. 28, 2017, 7 pgs.
European Search Report, EP Patent Application No. 16189300, dated Feb. 28, 2017, 4 pgs.
European Search Report, EP Patent Application No. 16189988.5, dated Mar. 1, 2017, 4 pgs.
European Search Report, EP Patent Application No. 16189982.5, dated Jan. 27, 2017, 9 pgs.
European Search Report, EP Patent Application No. 16189974, dated Mar. 2, 2017, 5 pgs.
European Search Report, EP Patent Application No. 16193743, dated Feb. 2, 2017, 5 pgs.
European Search Report, EP Patent Application No. 14868901.1, dated Jul. 7, 2017, 5 pgs.
L.H. Hsieh et al. Development of a Retrodirective Wireless Microwave Power Transmission System, IEEE, 2003 pp. 393-396.
B.D. Van Veen et al., Beamforming: A Versatile Approach to Spatial Filtering, IEEE, ASSP Magazine, Apr. 1988, pp. 4-24.
Leabman, Adaptive Band-partitioning for Interference Cancellation in Communication System, Thesis Massachusetts Institute of Technology, Feb. 1997, pp. 1-70.
Panda, SIW based Slot Array Antenna and Power Management Circuit for Wireless Energy Harvesting Applications, IEEE APSURSI, Jul. 2012, 2 pgs.
Zhai, "A Practical wireless charging system based on ultra-wideband retro-reflective beamforming" 2010 IEEE Antennas and Propagation Society International Symposium, Toronto, ON 2010, pp. 1-4.
Mao: BeamStar: An Edge-Based Approach to Routing in Wireless Sensors Networks, IEEE Transactions on Mobile Computing, IEEE Service Center, Los Alamitos, CA US, vol. 6, No. 11, Nov. 1, 2007, 13 pgs.
Smolders—Institute of Electrical 1-15 and Electronics Engineers: "Broadband microstrip array antennas" Digest of the Antennas and Propagation Society International Symposium. Seattle, WA Jun. 19-24, 1994. Abstract 3 pgs.
Paolo Nenzi et al; "U-Helix: On-chip short conical antenna", 2013 7th European Conference on Antennas and Propagation (EUCAP), ISBN:978-1-4673-2187-7, IEEE, Apr. 8, 2013, 5 pgs.
Adamiuk G et al; "Compact, Dual-Polarized UWB-Antanna, Embedded in a Dielectric" IEEE Transactions on Antenna Propagation, IEEE Service Center, Piscataway, NJ, US vol. 56, No. 2, ISSN: 0018-926X, abstract; Figure 1, Feb. 1, 2010, 8 pgs.
Mascarenas et al.; "Experimental Studies of Using Wireless Energy Transmission for Powering Embedded Sensor Nodes." Nov. 28, 2009, Journal of Sound and Vibration, pp. 2421-2433.
International Search Report and Written Opinion of the International Searching Authority dated Mar. 3, 2016 in International Application No. PCT/US15/67275, 33 pages.
International Search Report and Written Opinion dated Mar. 4, 2016 in International Application No. PCT/US15/67291, 10 pages.
International Search Report and Written Opinion of the International Searching Authority dated Mar. 30, 2016 in International Application No. PCT/US15/67250, 12 pages.
Notification of Transmittal of the International Search Report and the Written Opinion of the International Searching Authority, or the Declaration issued in International Application No. PCT/US15/67242 dated Mar. 16, 2016.
International Search Report and Written Opinion of the International Searching Authority dated Mar. 10, 2016 in International Application No. PCT/US15/67243, 16 pages.
Notification of Transmittal of the International Search Report and the Written Opinion of the International Searching Authority, or the Declaration issued in International Application No. PCT/US15/67245 dated Mar. 17, 2016, 9 pages.
International Search Report and Written Opinion dated Feb. 2, 2016 in International Application No. PCT/US15/67287, 9 pages.
International Search Report issued in International Application No. PCT/US2014/037109 dated Apr. 8, 2016, 4 pages.
International Search Report and Written Opinion dated Dec. 22, 2014 in International Application No. PCT/US2014/055195, 12 pages.
Singh, V. et al., "Wireless Power Transfer Using Metamaterial Bonded Microstrip Antenna for Smart Grid WSN," In Fourth International Conference on Advances in Computing and Communications (ICACC), Aug. 27-29, 2014, Abstract, p. 299.
T. Gill et al., "A System for Change Detection and Human Recognition in Voxel Space Using the Microsoft Kinect Sensor", 2011 IEEE Applied Imagery Pattern Recognition Workshop, Oct. 2011, 8 pages.
J. Han et al., Enhanced Computer Vision with Microsoft Kinect Sensor: A Review, IEEE Transactions on Cybernetics, vol. 43, No. 5, Oct. 2013, p. 1318-1334.
International Search Report dated Sep. 12, 2014 corresponding to International Patent Application No. PCT/US2014/037072, 3 pages.
International Search Report dated Sep. 15, 2015 corresponding to International Patent Application No. PCT/US2014/037170, 4 pages.
International Search Report dated Oct. 16, 2014 corresponding to International Patent Application No. PCT/US2014/041546, 4 pages.
International Search Report dated Oct. 13, 2014 corresponding to International Patent Application No. PCT/US2014/041534, 4 pages.
International Search Report dated Nov. 12, 2014 corresponding to International Patent Application No. PCT/US2014/046956, 4 pages.
Written Opinion of the International Searching Authority dated Nov. 12, 2014 corresponding to International Patent Application No. PCT/US2014/046956, 6 pages.
Energous Corp., ISRWO, PCT/US2018/012806 , dated Mar. 23, 2018, 9 pgs.
Order Granting Reexamination Request Control No. 90013793 Aug. 31, 2016, 23 pgs.
*Ossia Inc.* vs *Energous Corp.*, PGR2016-00023—Institution Decision, Nov. 29, 2016, 29 pgs.
*Ossia Inc.* vs *Energous Corp.*, PGR2016-00024—Institution Decision, Nov. 29, 2016, 50 pgs.
*Ossia Inc.* vs *Energous Corp.*, PGR2016-00024—Judgement—Adverse, Jan. 20, 2017, 3 pgs.
ReExam Ordered Control No. 90013793 Feb. 2, 2017, 8 pgs.
*Ossia Inc.* vs *Energous Corp.*, Declaration of Stephen B. Heppe in Support of Petition for Post-Grant Review of U.S. Pat. No. 9,124,125, PGR2016-00024, May 31, 2016, 122 pgs.
*Ossia Inc.* vs *Energous Corp.*, Petition for Post-Grant Review of U.S. Pat. No. 9,124,125, May 31, 2016, 92 pgs.
*Ossia Inc.* vs *Energous Corp.*, Patent Owner Preliminary Response, Sep. 8, 2016, 95 pgs.
*Ossia Inc.* vs *Energous Corp.*, Petition for Post Grant Review of U.S. Pat. No. 9,124,125, May 31, 2016, 86 pgs.
*Ossia Inc.* vs *Energous Corp.*, Declaration of Stephen B. Heppe in Support of Petition for Post-Grant Review of U.S. Pat. No. 9,124,125, PGR2016-00023, May 31, 2016, 144 pgs.
Li et al. High-Efficiency Switching-Mode Charger System Design Considerations with Dynamic Power Path Management, Mar./Apr. 2012 Issue, 8 pgs.

* cited by examiner

SYSTEMS AND METHODS OF PROVIDING WIRELESS POWER USING RECEIVER DEVICE SENSOR INPUTS

CROSS-REFERENCE TO RELATED APPLICATIONS

This non-provisional patent application claims the benefit of U.S. Provisional Patent Application Ser. No. 62/272,571, entitled "Systems and Methods of Providing Wireless Power Using Receiver Device Sensor Inputs," filed Dec. 29, 2015, which is incorporated by reference herein in its entirety.

This application is a continuation-in-part of U.S. patent application Ser. No. 14/856,337, entitled "Systems and Methods for Wireless Power Charging," filed Sep. 16, 2015, which is incorporated by reference herein in its entirety.

This application is a continuation-in-part of U.S. patent application Ser. No. 14/584,412, entitled "System and Method for Providing Health Safety in a Wireless Power Transmission System," filed Dec. 29, 2014, which is a continuation-in-part of U.S. patent application Ser. No. 14/330,939, entitled "System and Method for Providing Health Safety in a Wireless Power Transmission System," filed Jul. 14, 2014, each of which is incorporated by reference herein in its entirety.

TECHNICAL FIELD

This application generally relates to wireless power transmission systems.

BACKGROUND

Numerous attempts have been made to wirelessly transmit energy to electronic devices, where a receiver device can receive the transmission and convert it to electrical energy. However, most conventional techniques are unable to transmit energy at any meaningful distance. For example, magnetic resonance provides electric power to devices without requiring an electronic device to be wired to a power resonator. However, the electronic device is required to be proximately located to a coil of the power resonator (i.e., within a magnetic field). Other conventional solutions may not contemplate user mobility for users who are charging their mobile devices or such solutions do not allow devices to be outside of a narrow window of operability.

Wirelessly powering a remote electronic device requires a means for identifying the location of electronic devices within a transmission field of a power-transmitting device. Conventional systems typically attempt to proximately locate an electronic device, so there are no capabilities for identifying and mapping the spectrum of available devices to charge, for example, in a large coffee shop, household, office building, or other three-dimensional space in which electrical devices could potentially move around. Moreover, what is needed is a system for managing power wave production, both for directionality purposes and power output modulation. Because many conventional systems do not contemplate a wide range of movement of the electronic devices they service, what is also needed is a means for dynamically and accurately tracking electronic devices that may be serviced by the power-transmitting devices.

Wireless power transmission may need to satisfy certain regulatory requirements. These devices transmitting wireless energy may be required to adhere to electromagnetic field (EMF) exposure protection standards for humans or other living beings. Maximum exposure limits are defined by US and European standards in terms of power density limits and electric field limits (as well as magnetic field limits). Some of these limits are established by the Federal Communications Commission (FCC) for Maximum Permissible Exposure (MPE), and some limits are established by European regulators for radiation exposure. Limits established by the FCC for MPE are codified at 47 CFR § 1. 1310. For electromagnetic field (EMF) frequencies in the microwave range, power density can be used to express an intensity of exposure. Power density is defined as power per unit area. For example, power density can be commonly expressed in terms of watts per square meter ($W/m^2$), milliwatts per square centimeter ($mW/cm^2$), or microwatts per square centimeter ($\mu W/cm^2$).

Accordingly, it is desirable to appropriately administer the systems and methods for wireless power transmission to satisfy these regulatory requirements. What is needed is a means for wireless power transmission that incorporates various safety techniques to ensure that humans or other living beings within a transmission field are not exposed to EMF energy near or above regulatory limits or other nominal limits. What is needed is a means for monitoring and tracking objects within a transmission field in real-time and providing a means for controlling the production of power waves to adaptively adjust to the environment within the transmission field.

SUMMARY

Disclosed herein are systems and methods intended to address the shortcomings in the art and may provide additional or alternative advantages as well. Embodiments disclosed herein may generate and transmit power waves that, as result of their physical waveform characteristics (e.g., frequency, amplitude, phase, gain, direction), converge at a predetermined location in a transmission field to generate a pocket of energy. Receivers associated with an electronic device being powered by the wireless charging system may extract energy from the pocket of energy and then convert that energy into usable electric power for the electronic device associated with a receiver. The pocket of energy may manifest as a three-dimensional field (e.g., transmission field), where energy may be received and converted by receivers positioned within or nearby a pocket of energy. In some embodiments, transmitters may perform adaptive pocket forming by adjusting transmission of the power waves to regulate power levels based on data obtained from sensors of an electronic device being charged. Additionally, in order to further identify people, objects, or other items populated within the transmitter's field of view, electronic device sensors may generate sensor data that may be processed to identify areas that the power waves should avoid. This sensor data may be an additional or alternative form of data that may be used along with transmitter sensor and camera data to identify people, objects, or other items populated within the transmitter's field of view.

In an embodiment, a method for wireless power transmission comprises transmitting, by a transmitter, power waves that converge to form constructive interference at a location associated with a receiver; receiving, by the transmitter, sensor data from one or more sensors of the electronic device representative of at least one of a proscribed orientation circumstance of the electronic device, a proscribed motion circumstance of the electronic device, and a proscribed ambient light circumstance of the electronic device; and adjusting, by the transmitter, a power level of the power waves upon receiving at least one of the proscribed orientation circumstance of the electronic device, the proscribed motion circumstance of the electronic device, and the proscribed ambient light circumstance of the electronic device. In addition to the types of sensor data enumerated above, the electronic device may include other sensors and it may communicate the associated data from these sensors as well.

In another embodiment, a transmitter for wireless power transmission comprises a processor configured to control transmission of power waves that converge to form constructive interference at a location associated with a receiver; and a memory operatively coupled with and readable by the processor and having stored therein machine-readable instructions that when executed by the processor cause the processor to: receive sensor data from one or more sensors of the electronic device representative of at least one of orientation, motion, and ambient light; and adjust a power level of the power waves upon receiving sensor data representative of at least one of orientation, motion, and ambient light that is similar to a proscribed circumstance.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the invention. The present disclosure can be better understood by referring to the following figures. The components in the figures are not necessarily to scale, emphasis instead being placed upon illustrating the principles of the disclosure.

DETAILED DESCRIPTION

Figure 1:
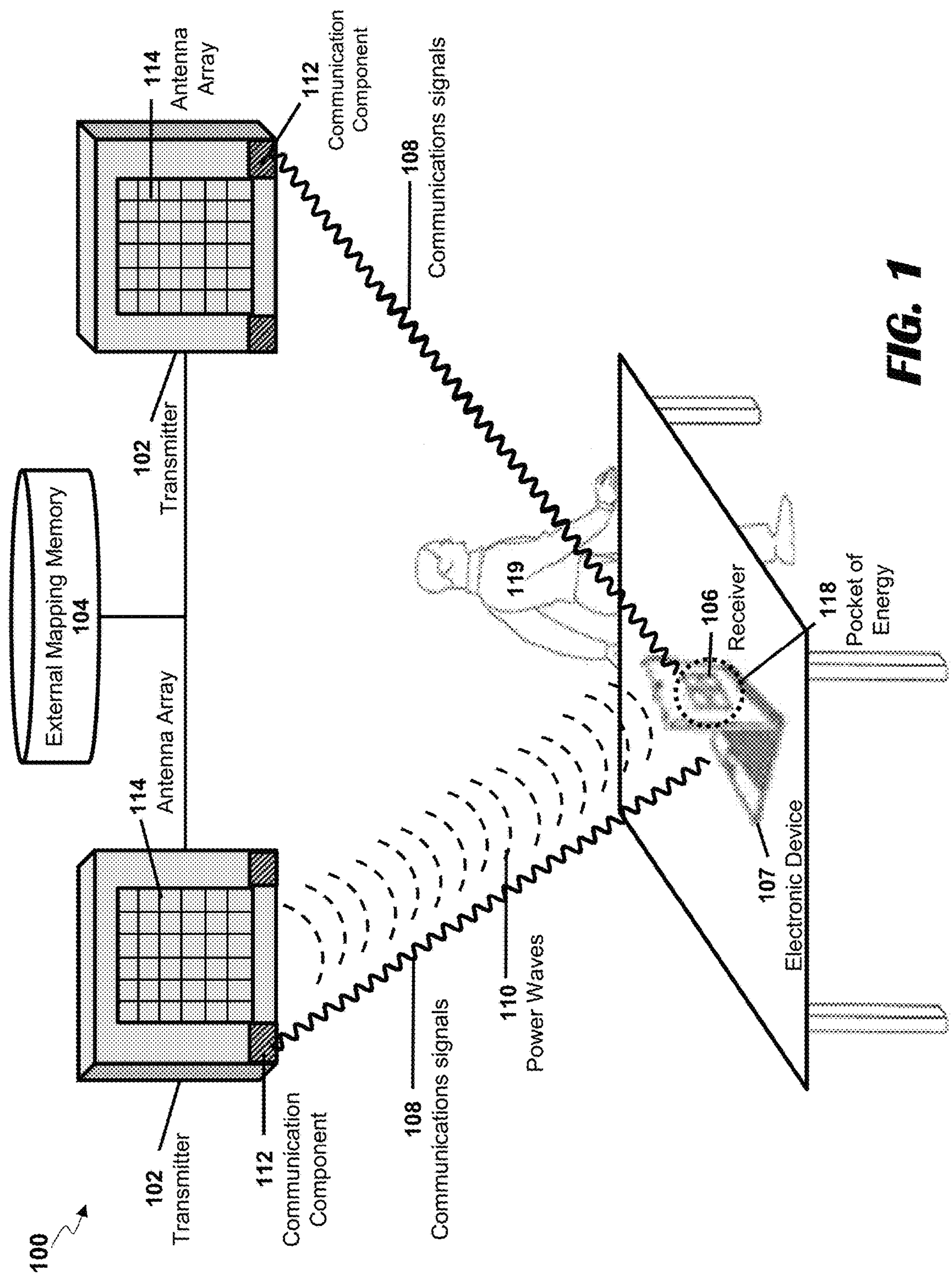
FIG. 1 shows components of an exemplary wireless power transmission system, according to an exemplary embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

In a wireless power transmission system, the transmitters are devices that comprise, or are otherwise associated with, various components and circuits responsible for, e.g., generating and transmitting power waves, forming pockets of energy at locations in a transmission field, monitoring the conditions of the transmission field, and generating null spaces where needed. The transmitter may generate and transmit power waves for pocket-forming based on location of one or more receivers and/or execute null steering based on the location of one or more sensitive objects, such as humans and animals, or sensitive medical devices, within a transmission field of the transmitter.

The transmitter comprises antennas that are configured to transmit power waves having certain physical waveform characteristics. The power waves may be transmitted to receivers within a transmission field of the transmitters in the form of any physical media capable of propagating through space and being converted into electrical energy for charging the one or more electronic devices. Examples of the physical media may include radio frequency (RF) waves, infrared, acoustics, electromagnetic fields, and ultrasound. The power transmission signals may include any radio signal and may have any frequency or wavelength. It should be appreciated by one skilled in the art that the wireless charging techniques are not limited to RF wave transmission techniques and may include alternative or additional techniques for transmitting energy to the receivers.

FIG. 1 shows components of an exemplary wireless power transmission system 100. The exemplary system 100 may include transmitters 102, an external mapping memory 104, a receiver 106, and an electronic device 107 to be charged. The transmitters 102 may send various types of waves such as communication signals 108 and power waves 110, into a transmission field, which may be the two or three-dimensional space into which the transmitters 102 may transmit the power waves 110.

The transmitters 102 may transmit the power waves 110, which may be captured by the receiver 106 configured to convert the energy of the power waves 110 into electrical energy, for the electronic device 107 associated with the receiver 106. The receiver 106 may include circuitry that may convert the captured power waves 110 into electrical energy on behalf of the electronic device 107 associated with the receiver 106. In some embodiments, the transmitters 102 may transmit the power waves 110 to the electronic device 107 by manipulating characteristics of the power waves 110 (e.g., phase, gain, direction, frequency) in response to receiving one or more sensor readings (sensor data) from one or more sensors of the electronic device 107. In other embodiments, the receiver 106 may be located in a case, external to the electronic device 107, wherein the case is coupled to the electronic device 107 via any one of a multitude of potential electrical and/or data connection points.

The sensor data may include data from one or more sensors, such as a sensor for time, orientation, motion, and ambient light. The sensor data from one or more sensors may be analyzed to determine if it is similar to a particular condition As referred to herein, a condition involving orientation where a power level should be adjusted or ceased based on that orientation may be referred to as a proscribed orientation circumstance of the electronic device 107. A condition involving motion where a power level should be adjusted or ceased based on that motion may be referred to as a proscribed motion circumstance of the electronic device 107. A condition involving ambient light where a power level should be adjusted or ceased based on that ambient light may be referred to as a proscribed ambient light circumstance of the electronic device 107. Still other conditions may result from a combination of data from one or more sensors, such as ambient light and orientation and/or time since the electronic device last experienced movement.

In some embodiments, the transmitters 102 may transmit the power waves 110 into the transmission field by manipulating characteristics of the power waves 110 (e.g., phase, gain, direction, frequency) based on the location associated with one or more sensitive objects such as humans 119 with respect to the receiver 106 and/or the transmitters 102. In some implementations, the transmitters 102 may manipulate the characteristics of the power waves 110 so that the trajectories of the power waves 110 cause the power waves 110 to converge at a predetermined location within a transmission field (e.g., a 3D location or region in space), resulting in constructive or destructive interference. The location of sensitive objects may be used in conjunction with the sensor data received from the one or more sensors of the electronic device. In some embodiments, data contained within the communications signals 108, for example, may contain location data associated with one or more objects, such as humans 119, received by the receiver 106, and may be used by the transmitter processor to determine how the transmitter 102 may transmit safe and effective power waves 110. The transmitter 102 may transmit safe and effective power waves 110 that generate a pocket of energy 118, from which the receiver 106 may capture energy and convert it to useable alternating current (AC) or direct current (DC) electricity. Using the communications signal 108, the transmitter 102 may communicate data that may be used, e.g., to identify the receiver 106 within the transmission field, determine whether the electronic device 107 or users are authorized to receive wireless charging services from the system 100, poll receivers to transmit back certain sensor data, determine safe and effective waveform characteristics for the power waves 110, and hone the placement of the pocket of energy 118, among other possible functions.

The transmitters 102 may comprise or be associated with one or more transmitter processors (not shown), a communications component 112, and an antenna array 114. The one or more transmitter processors may control, manage, and otherwise govern the various processes, functions, and components of the transmitters 102. The one or more transmitter processors may be configured to process and communicate various types of data (e.g., data obtained from sensors in the electronic device 107, data associated with the receiver 106, data associated with the one or more objects such as humans 119). Additionally or alternatively, a transmitter processor of the transmitters 102 may manage execution of various processes and functions of the transmitters 102, and may manage the components of the transmitters 102. For example, the transmitter processor may determine an interval at which a beacon signal may be broadcast by a communication component 112 to identify the receiver 106 that may inhabit the transmission field.

The communication component 112 may effectuate wired and/or wireless communications to and from the receiver 106 of the system 100. In some cases, the communication component 112 may be an embedded component of the transmitter 102; and, in some cases, the communication component 112 may be attached to the transmitter 102 through any wired or wireless communications medium. The communication component 112 may comprise electromechanical components (e.g., processor, antenna) that allow the communication component 112 to communicate various types of data with one or more receivers 106 via the communications signals 108. In some implementations, the communications signals 108 may represent a distinct channel for hosting communications, independent from the power waves 110. The data may be communicated using the communications signals 108, based on predetermined wired or wireless protocols and associated hardware and software technology. The communications component 112 may operate based on any number of communication protocols, such as Bluetooth®, Wireless Fidelity (Wi-Fi), Near-Field Communications (NFC), ZigBee, and others. In some other embodiments the communications signals may occupy the same frequency band as the power waves.

A communications component (shown in FIG. 1) of the receiver 106 may use the communications signal 108 to communicate data obtained from one or more sensors that may be used to alert transmitters 102 of the orientation, motion, or ambient light conditions, e.g., by transmitting the proscribed orientation circumstance of the electronic device 107, the proscribed motion circumstance of the electronic device 107, and/or the proscribed ambient light circumstance of the electronic device 107, and/or the timing of the last such circumstance, to determine whether the transmitter 102 can safely transmit effective power waves 110. In some embodiments, the communications component of the receiver 106 may use the communications signal 108 to communicate data that may be used to alert transmitters 102 that the receiver 106 has entered, or is about to enter, the transmission field, provide the location data generated that is associated with the one or more sensitive objects such as humans 119, provide information about the electronic device 107 being charged by the receiver 103, indicate the effectiveness of the power waves 110, and provide updated transmission parameters that the transmitters 102 may use to adjust the power waves 110, as well as other types of useful data. As an example, the communications component 112 of the transmitter 102 may communicate (i.e., send and receive) different types of data containing various types of information. Non-limiting examples of the information may include a beacon message, a transmitter identifier (TX ID), a device identifier (device ID) for an electronic device 107, a user identifier (user ID), the battery level for the device 107, applications being currently used (e.g., phone call application) by the device 107, the receiver's 106 location in the transmission field, the amount of time since the device last experienced motion or a change in orientation, the objects 120 location in the transmission field, orientation sensor data, motion sensor data, ambient light sensor data, the proscribed orientation circumstance of the electronic device 107, the proscribed motion circumstance of the electronic device 107, and the proscribed ambient light circumstance of the electronic device 107, and other such information.

The antenna array 114 of the transmitters 102, which may be a set of one or more antennas, is configured to transmit the power waves 110. In some embodiments, the antenna array 114 may comprise antennas, which may be configurable "tiles" comprising an antenna and may include an integrated circuit controlling the behavior of the antenna, where the antenna generates the power waves 110 having predetermined characteristics (e.g., amplitude, frequency, trajectory, phase). An antenna of the antenna array 114 may transmit a series of the power waves 110 having the predetermined characteristics, such that the power waves 110 arrive at a given location within the transmission field in a manner that they create a pocket of energy. Taken together, the antennas of the antenna array 114 may transmit the power waves 110 that converge at the given location (usually where the receiver 106 is detected) and due to their respective characteristics, form a constructive interference pattern shown as a pocket of energy 118, from which the receiver 106 may collect energy and generate electricity. It should be appreciated that, although the exemplary system 100 describes radio-frequency based power waves 110, additional or alternative transmitting arrays or elements and/or wave-based technologies may be used (e.g., ultrasonic, infrared, magnetic resonance) to wirelessly transmit power from the transmitter 102 to the receiver 106.

The sensor data may be interpreted by the receiver 106 or electronic device 107, and a processed version of the data may be transmitted to the transmitter 102 to adjust the power wave transmission accordingly. Alternatively, the sensor data may be interpreted by processors associated with the transmitter 102, from which the transmitter 102 may determine how the antennas of the antenna array 114 should form and transmit the power waves 110. When determining how the power waves should be formed, the transmitter 102 determines waveform characteristics for each of the power waves 110 to be transmitted from each of the respective antennas of the antenna array 114. Non-limiting examples of waveform characteristics for the power waves 110 may include: amplitude, phase, gain, frequency, and direction, among others.

In one embodiment, upon determining that the receiver 106 should not receive power waves, the transmitter 102 can generate a null space rather than a pocket of energy at a particular location. The transmitter 102 identifies a subset of antennas from the antenna array 114 that sends the power waves 110 that form destructive interference patterns, thereby diminishing or eliminating the amount of energy concentrated at the location.

Although the exemplary embodiments described herein mention the use of RF-based wave transmission technologies, it should be appreciated that the wireless charging techniques that might be employed are not be limited to such RF-based technologies and techniques. Rather, it should be appreciated that there are additional or alternative wireless charging techniques, which may include any number of technologies and techniques for wirelessly transmitting energy to a receiver that is capable of converting the transmitted energy to electrical power. Non-limiting exemplary transmission techniques for energy that can be converted by a receiving device into electrical power may include: ultrasound, microwave, laser light, infrared, or other forms of electromagnetic energy.

In some embodiments, control systems of transmitters 102 adhere to electromagnetic field (EMF) exposure protection standards for human subjects. Maximum exposure limits are defined by US and European standards in terms of power density limits and electric field limits (as well as magnetic field limits). These include, for example, limits established by the Federal Communications Commission (FCC) for MPE, and limits established by European regulators for radiation exposure. Limits established by the FCC for MPE are codified at 47 CFR § 1.1310. For electromagnetic field (EMF) frequencies in the microwave range, power density can be used to express an intensity of exposure. Power density is defined as power per unit area. For example, power density can be commonly expressed in terms of watts per square meter (W/m2), milliwatts per square centimeter (mW/cm2), or microwatts per square centimeter (μW/cm2).

In some embodiments, the present systems and methods for wireless power transmission 100 incorporate various safety techniques to ensure that human occupants in or near a transmission field are not exposed to EMF energy near or above regulatory limits or other nominal limits. One safety method is to include a margin of error (e.g., about 10% to 20%) beyond the nominal limits, so that human subjects are not exposed to power levels at or near the EMF exposure limits. A second safety method can provide staged protection measures, such as reduction or termination of wireless power transmission if humans (and in some embodiments, other living beings or sensitive objects) move toward a pocket of energy with power density levels exceeding EMF exposure limits.

Figure 2:
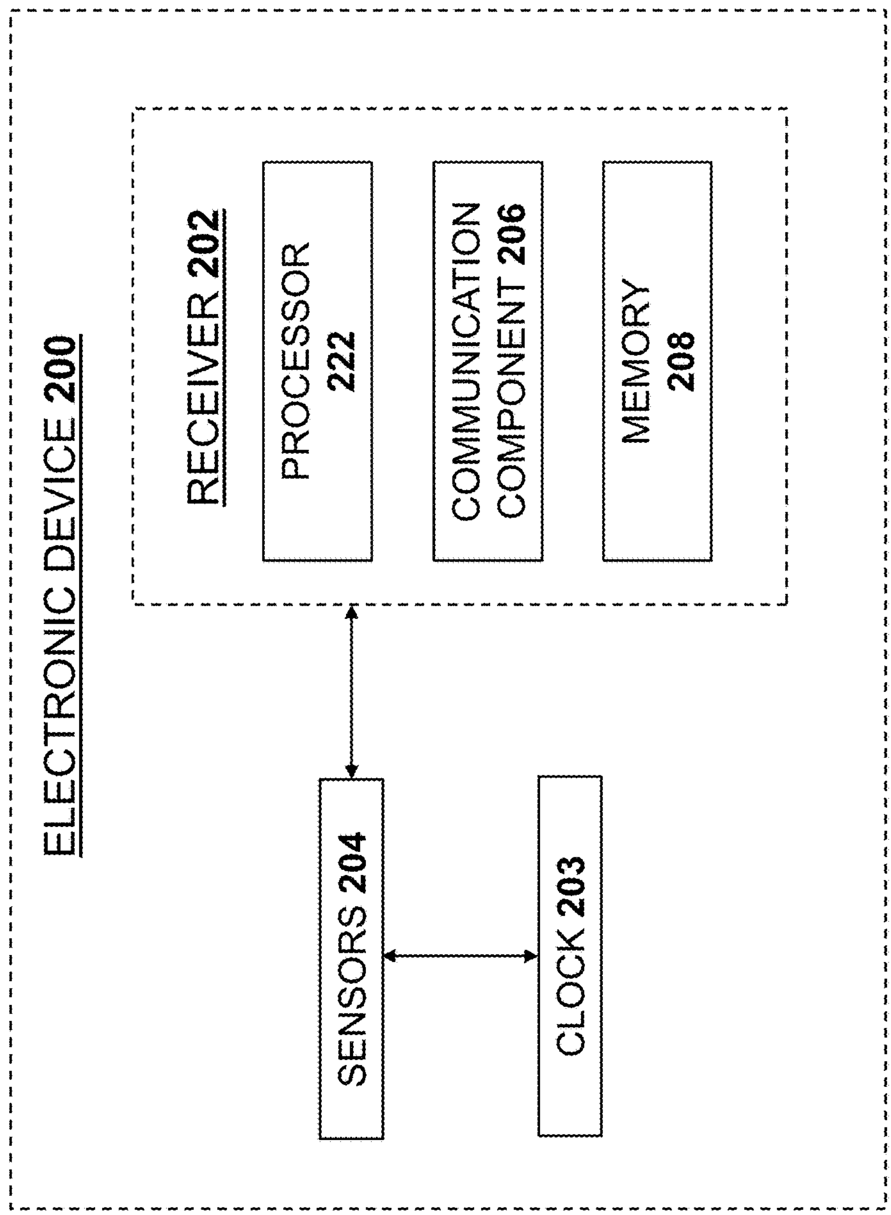
FIG. 2 shows an exemplary electronic device having a receiver of a wireless power transmission system, according to an exemplary embodiment.

FIG. 2 shows an exemplary electronic device 200 having a receiver 202 of a wireless power transmission system, according to an exemplary embodiment. The electronic device 200 coupled to the receiver 202 may be any electrical device that requires continuous electrical energy or that requires power from a battery. The receiver 202 may be permanently integrated into the electronic device 200, or the receiver 202 may be detachably coupled to the electronic device 200, which, in some cases, may result in a single integrated product or unit. As an example, the electronic device 200 may be placed into a protective sleeve comprising embedded receivers 202 that are detachably coupled to the device's power supply input. Non-limiting examples of electronic devices 200 may include laptops, mobile phones, smartphones, tablets, music players, toys, batteries, flashlights, lamps, electronic watches, cameras, gaming consoles, appliances, GPS devices, and wearable devices or so-called "wearable" (e.g., fitness bracelets, pedometers, smart watch), among other types of electrical devices 200.

Electronic devices 200 may comprise embedded or associated sensors 204 such as accelerometers, gyroscopes, and/or ambient light sensors, which may act as a sensor data source for a transmitter. Electronic device 200 may further include a clock 203, which determines the passage of time between various sensor related circumstances, such as motion, orientation, acceleration, and/or changes in lighting circumstances. In some embodiments, the sensor data can supplement heat-map data and/or mapping data, as generated by sensors associated with the transmitter, to determine how the transmitter may safely and effectively transmit power waves. In some embodiments, heat-map data may be generated by transmitter processors to identify receivers located in a transmission field. For example, the transmitter processor may determine an interval at which a beacon signal may be broadcast by a communications component of the transmitter, to identify receivers that may inhabit the transmission field. The transmitter processor may generate heat-mapping data from communications signals received by the communications component. Determinations of how to adjust power wave transmissions may be based upon the clock and/or sensor data from one or more sensors, and proscribed circumstances may be based upon sensor data from one or more sensors.

The accelerometer may provide sensor data to indicate that the electronic device is moving, whereby the transmitter may determine that it should cease transmission when it appears that a human or other sensitive object is moving the electronic device. Even small movements detected by an accelerometer may indicate that the electronic device may be in the presence or being held by a human being, so transmission should cease. The accelerometer of the electronic device 200 can be a Micro-Electro-Mechanical Sensors (MEMS) used to detect motion and/or measure nongravitational acceleration of the electronic device 200. The accelerometer may measure acceleration of the electronic device 200 in one, two, or three orthogonal axes. When the electronic device 200 goes from a standstill to any velocity, the accelerometer responds to the vibrations associated with such movement. The accelerometer may use microscopic crystals that go under stress when vibrations occur, and from that stress, a voltage is generated to create a reading on any acceleration, and thereby measure linear acceleration of movement of the electronic device 200. Accordingly, the accelerometer can gauge the movement of an electronic device 200.

The output of the accelerometer of the electronic device 200 can be processed to determine if the sensor data is substantially similar to a proscribed motion circumstance of the electronic device 200, which may correspond to any motion or a particular motion of the electronic device 200. The detection of motion of the electronic device 200 may indicate that the electronic device 200 is being moved by its user. The proscribed motion circumstance may indicate a risk that the transmission of power waves to charge or power the electronic device 200 may expose the user to unsafe or undesirable radiation levels as the user is less than a pre-defined proximity to the electronic device 200.

A gyroscope can determine orientation of the electronic device, whereby a particular orientation may be associated with an interaction with a sensitive object (e.g., a human holding a phone to his head or a phone in a pocket), whereas other orientations may be associated with a lack of interaction with a sensitive object (e.g., laying horizontal, especially when in conjunction with lack of movement determined by the accelerometer and further when in conjunction with the passage of a threshold time period since movement last occurred). The time-period of the lack of movement of the electronic device may be determined by the clock 203. Even small movements detected by a gyroscope may indicate that the electronic device may be in the presence of or may being held by a human being, so transmission should cease. The gyroscope of the electronic device 200 can measure a rate of rotation of the electronic device 200 around a particular axis and is able to sense motion including both vertical and horizontal rotation of the electronic device 200. When gauging the rate of rotation around the roll axis of the electronic device 200, the gyroscope identifies an actual value until the electronic device 200 stabilizes out. Accordingly, by using the principles of angular momentum, the gyroscope can indicate orientation of the electronic device 200. The gyroscope can provide data over a period of time to indicate a rotation of the electronic device over that period, whereby a rotation may indicate that it is in the presence of a human or other sensitive object. The period or passage of time that corresponds to period of the rotation of the electronic device may be measured by the clock 203. The clock 203 may further measure the passage of time between various other sensor related circumstances, such as motion, orientation, acceleration, and/or changes in lighting circumstances. The measured period of the time by the clock 203 may indicate a time-period during which there is a risk that the transmission of power waves to charge or power the electronic device 200 may expose the user to unsafe or undesirable radiation levels as the user may be less than a pre-defined proximity to the electronic device 200.

Although described in the exemplary embodiment as sensor data, it is intended that the sensor data is not limited to raw sensor data and can include data that is processed by a processor associated with the sensor, processed by the receiver, processed by the transmitter, or any other processor. The sensor data can include information derived from the sensor, and processed sensor data can include determinations based upon the sensor data. For example, the gyroscope of the electronic device 200 may provide raw data such as an orientation in X-plane, Y-plane, and Z planes, and processed sensor data from the gyroscope may include a determination of the orientation or a circumstance involving that orientation of the electronic device 200.

The use of the accelerometer and/gyroscope data of the electronic device 200 may generate a proscribed orientation circumstance of the electronic device 200 that corresponds to a substantially vertical orientation of the electronic device 200. In one instance, a vertical or near vertical orientation of the electronic device 200 indicates that the electronic device 200 is being held in the vertical orientation by a user near the user's head. In another instance, a vertical or near vertical orientation of the electronic device 200 indicates that the electronic device 200 is being carried by a user in the vertical orientation, e.g., in the user's pocket or in a case, holster, or other carrier. In another instance, a vertical orientation indicates that the electronic device is in a cradle for charging, so accelerometer data, particularly when combined with clock data obtained from the clock 203, will indicate that despite the vertical orientation, the electronic device is stationary. In another instance, a near perfect horizontal orientation of the electronic device 200 may indicate that the device is positioned on top of a surface, such as a table, counter or desk. The proscribed orientation circumstance may then be used to determine risk regarding the transmission of power waves to charge or power the electronic device 200 that may expose the user to unsafe or undesirable radiation levels.

In order to simplify the description above, reference has been made to an accelerometer and gyroscope, each in a singular sense. In practice, the electronic device 200 may have a three-dimensional accelerometer or three accelerometers with mutually orthogonal sensitive axes, often referred to as a 3-D accelerometer. The electronic device may have an X-axis accelerometer, Y-axis accelerometer, and Z-axis accelerometer. Similarly, the electronic device 200 also has a 3-D gyroscope or an X-axis gyroscope, Y-axis gyroscope, and Z-axis gyroscope.

The ambient light sensor measures intensity of visible light received by the sensor, and a lack of ambient light may indicate that the electronic device is in a pocket or may be face-down on a table. In an embodiment, the ambient light sensor includes photo diodes that are sensitive to different spectra of visible light, to more accurately measure intensity of light received by the ambient light sensor. The output of the ambient light sensor includes a proscribed ambient light circumstance of the electronic device. The proscribed ambient light circumstance includes an ambient light reading that has a low intensity in comparison with one or more other ambient light readings acquired near the electronic device. A low intensity measurement by an ambient light sensor indicates low ambient light in a room, and the electronic devices including the ambient light sensors may increase screen brightness to compensate. However, where an ambient light sensor from an electronic device detects a low intensity of light, whereas one or more ambient light readings acquired near the electronic device have a higher intensity, the low intensity light reading from the user light may indicate that the electronic device is in a user's pocket or otherwise carried by the user with the electronic device covered. The ambient light sensor can provide data over a period of time to indicate whether the electronic device has a changed amount of ambient light, which may indicate, for example, that the electronic device has become or is no longer in a pocket or face down on a table. Such data may also be combined with clock data to determine whether a threshold passage of time has elapsed in which no change in ambient light has been observed. The proscribed ambient light circumstance therefore may indicate a risk that the transmission of the power waves to charge or power the electronic device may expose the user to unsafe or undesirable radiation levels.

The electronic device 200 or the associated receiver 202, are also associated with a communications component 206 capable of communicating with a transmitter. The communications component 206 may use communications signal to communicate data obtained from the sensors 204 that may be used to, e.g., alert transmitters of the proscribed orientation circumstance of the electronic device 200, the proscribed motion circumstance of the electronic device 200, and the proscribed ambient light circumstance of the electronic device 200 to determine how the transmitter may safely and effectively transmit power waves. On receiving the proscribed orientation circumstance of the electronic device 200, the proscribed motion circumstance of the electronic device 200, and/or the proscribed ambient light circumstance of the electronic device 200, and/or data regarding the temporal nature of such circumstances, the transmitter can adjust or cease transmission of the power waves.

To enable the transmitter to locate and identify the electrical device 200, a user may communicate to the transmitter, data obtained from the sensors 204 which may be recorded into an memory 208. For example, the user may provide data using the communications component 206 or may provide data via an electronic device (e.g., laptop, smartphone, administrative computer or server) that is in communication with the transmitter or memory 208. The electronic device may execute an administrative software application that permits the user, via a graphical user interface (GUI), to generate information of the proscribed orientation circumstance of the electronic device 200, the proscribed motion circumstance of the electronic device 200, and the proscribed ambient light circumstance of the electronic device 200, and/or data regarding the temporal nature of such circumstances. The information of the proscribed orientation circumstance of the electronic device 200, the proscribed motion circumstance of the electronic device 200, and the proscribed ambient light circumstance of the electronic device 200 may then be stored as mapping data (e.g., sensor data) into the memory 208 for retrieval by one or more processors (e.g., receiver processor 222, sensor processor, electronic device processor). In addition to proscribed orientation circumstance of the electronic device 200, the proscribed motion circumstance of the electronic device 200, and the proscribed ambient light circumstance of the electronic device 200, exemplary information may also include location data for the electronic device 200, level of power usage of the electronic device 200, duration of power usage of the electronic device 200, power transfer schedule of the electronic device 200, data regarding the temporal nature of the sensor data, and authentication credentials of the electronic device 200.

Figure 3:
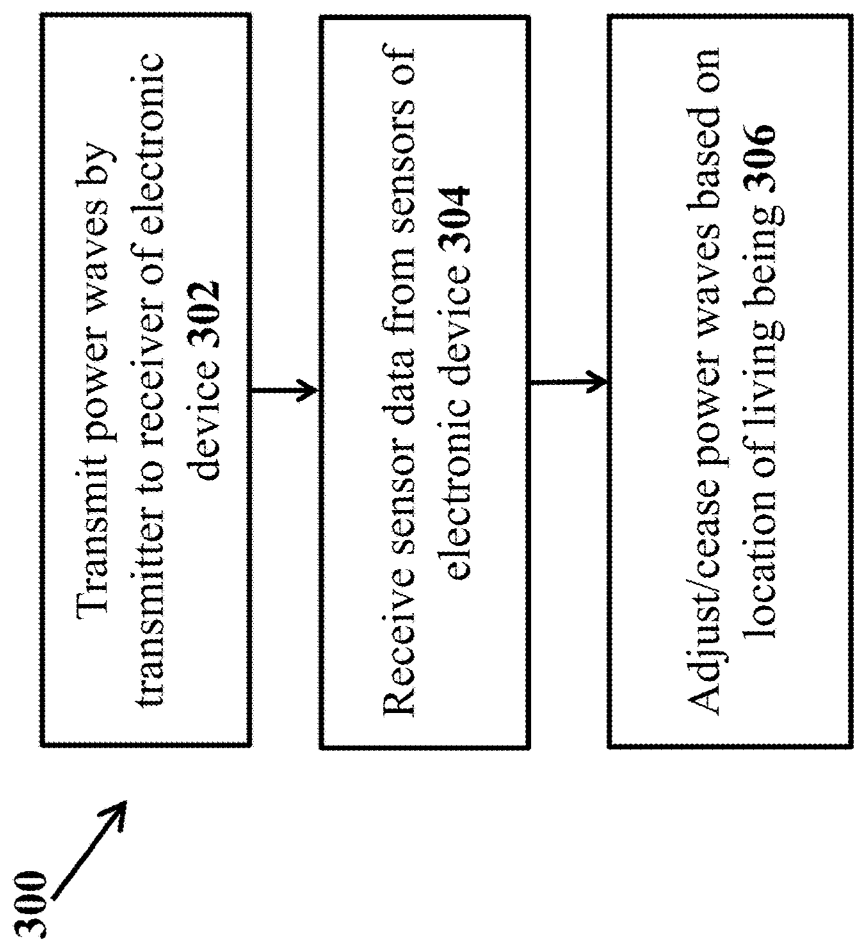
FIG. 3 is a flow diagram illustrating a method of identifying objects within a transmission field of a transmitter of a wireless power transmission system, according to an exemplary embodiment.

FIG. 3 is a flow diagram 300 illustrating a method of adjusting transmission of power waves to receivers of electronic devices within a transmission field of a transmitter of a wireless power transmission system, according to an exemplary embodiment. The transmitter of the wireless power transmission system may receive sensor data from one or more sensors of the electronic device. The electronic device is operatively coupled to the receiver for receiving power waves transmitted by a transmitter. The sensor data from the electronic device may include orientation data, motion data, and/or ambient light data, or may be representative of one or more proscribed circumstance that may indicate when a living being or sensitive object, such as a human, may be interacting with the electronic device and thus in close proximity to a pocket of energy, power waves, and/or the transmitter. In some embodiments, the proscribed circumstances may include a proscribed orientation circumstance, a proscribed motion circumstance, and/or a proscribed ambient light circumstance of the electronic device. In response to the sensor data received from the sensors of the electronic device, a processor of the transmitter processes the sensor data and may reduce intensity of power waves, terminate transmission of power waves, or may form a null space at or near the electronic device, among a number of additional or alternative actions.

At step 302, a transmitter transmits power waves that converge in three dimensional space to form a constructive interference pattern at the receiver. In some embodiments, multiple transmitters and/or multiple receivers may power various electronic devices. The receiver may be separable from the electronic device or integrated with the electronic device.

At step 304, the transmitter receives sensor data from one or more sensors of the electronic device. In an embodiment, the electronic device may include one or more sensors. The one or more sensors may be selected from a group consisting of an accelerometer, a gyroscope, and an ambient light sensor. Each of the one or more sensors may work independently to produce sensor data. In some embodiment, each of the one or more sensors work together to produce sensor data.

Operationally, before a link between the transmitter and the receiver is established and wireless power charging has commenced, the transmitter may request sensor data from the receiver, or may request a function of the sensor data that the electronic device is collecting, before starting sending wireless power waves to the receiver. If some of the proscribed conditions are met, the transmitter may decide that the receiver is near a human being or a sensitive object and may not initiate wireless power charging. Similarly, the receiver may make the determination that a human being is near and refrain from initiating wireless power transfer.

A proscribed orientation circumstance of the electronic device generated by the one or more sensors corresponds to an orientation of the electronic device. For example, the proscribed orientation circumstance may indicate that the electronic device is in a vertical or near vertical orientation, which could be indicative of cell phone being placed against the head of a human. In another instance, a vertical or near vertical orientation of the electronic device indicates that the electronic device is being carried by a user in the vertical orientation, e.g., in the user's pocket or in a case, holster, or other carrier. In another instance, a near perfect horizontal orientation of the electronic device 200 may indicate that the device is positioned on top of a surface, such as a table, counter or desk. The proscribed orientation circumstance may then be used to determine risk regarding the transmission of power waves to charge or power the electronic device that may expose the user to unsafe or undesirable radiation levels.

The orientation of the electronic device may indicate that the transmitter should increase the power waves transmitted to the electronic device. For example, an orientation circumstance of the electronic device generated by the one or more sensors corresponds to an orientation of the electronic device in which the electronic device has a substantially horizontal orientation. A horizontal orientation of the electronic device may indicate that the electronic device has been left at that location for a period of time and may require charging or powering, especially when the orientation remains unchanged for a period of time. Furthermore, this orientation circumstance tends to indicate that the electronic device is not being held or carried by a user, and the power waves may be transmitted.

A proscribed motion circumstance of the electronic device corresponds to motion of the electronic device. The motion of the electronic device is determined from processing of the sensor data obtained from an accelerometer of the electronic device. The detection of motion of the electronic device indicates that the electronic device is being moved by a user. The proscribed motion circumstance and other proscribed circumstances therefore may indicate a risk that the transmission of power waves to charge or power the electronic device may expose the user to unsafe or undesirable radiation levels. In another embodiment, a proscribed motion circumstance of the electronic device includes a motion of the electronic device represented by the sensor data received from the electronic device, in combination with one or more additional sensor data that indicate presence of a living being.

A proscribed ambient light circumstance of the electronic device includes an ambient light reading of an ambient light sensor that has a low intensity in comparison with one or more other ambient light readings acquired near the electronic device. A low intensity measurement by an ambient light sensor indicates low ambient light in a room, and the electronic devices including the ambient light sensors may increase screen brightness to compensate. However, where an ambient light sensor from an electronic device detects a low intensity of light, whereas one or more ambient light readings acquired near the electronic device have a higher intensity, the low intensity light reading from the user light may indicate that the electronic device is in a user's pocket or otherwise carried by the user with the electronic device covered. This proscribed ambient light circumstance therefore may indicate a risk that the transmission of the power waves to charge or power the electronic device may expose the user to unsafe or undesirable radiation levels.

It should be understood by someone skilled in the art that that proscribed conditions related to motion, orientation, ambient light, heat sensors, magnetic sensors, or any other kind of sensors may be used as individual indicators or may be used in combination to indicate proscribed conditions that indicate a human being or a sensitive object is near a receiver. One or more proscribed conditions of the sensors may be combined along with time lapse indicators also. In addition, the considering of proscribed conditions, or sensor outputs, generated by one or more sensors may be processed according to a function to obtain a proscribed condition indicative of a human being being nearby. The function may be a single variable or multi variable function. The function may be a linear or non-linear function.

Temporal input to the decision making, regardless of what other sensors are used, may be a safety feature. The proscribed conditions may indicate that the receiver is placed on a horizontal surface and it is not moving, and therefore likely to have been placed on a table and may be appropriately charged. However the temporal input, such as a timer, which may also include a hysteresis, may also be included to assure that there was enough time for a human being to move away from the receiver after placing it on the table before generating the proscribed condition signal to trigger wireless charging.

It should be understood by someone skilled in the art that the sensors may be included in the electronic device or they may be included in the receiver, or both. It should also be understood that the receiver may be an integral part of the electronic device or may be removably connected to the electronic device. Communication of signals maybe from the electronic device to the transmitter or may be from a separate transmitter of the receiver to the transmitter of the power waves.

It should be understood by someone skilled in the art that the sensor outputs may be used in determining presence of proscribed conditions as the sensor data is generated, or a time average of multiple sensor outputs may be used in determining the proscribed condition exists.

In some embodiments, the transmitter receives the sensor data at different points in time from the one or more sensors of the electronic device. The one or more proscribed circumstances is then calculated based upon the sensor data obtained over a period of time. In one embodiment, a proscribed motion circumstance may be represented by a change of value of the sensor data over the different points in time and thereby indicating a motion of the electronic device. In another embodiment, a proscribed orientation circumstance of the electronic device is a change in orientation of the electronic device indicated by the sensor data at different points in time. In another embodiment, clocking data is generated to determine the period of time since the last change in any of the above described sensor circumstances described above.

In another embodiment, the transmitter receives the sensor data from the one or more sensors of the electronic device representative of at least two of the proscribed orientation circumstance of the electronic device, the proscribed motion circumstance of the electronic device, the proscribed ambient light circumstance of the electronic device and the time that has elapsed since the last change in the respective sensor circumstances described above. In another embodiment, the transmitter receives the sensor data from an orientation sensor of the electronic device, wherein the orientation sensor output is representative of both a proscribed orientation circumstance of the electronic device and a proscribed motion circumstance of the electronic device.

At step 306, transmitter may adjust (e.g., increase, decrease, or cease) transmission based upon a likely proximity of a living being or sensitive object with the power waves or electronic device. In some embodiments, the transmitter reduces the power level of the power waves. In other embodiments, the transmitter terminates transmission of the power waves. In other embodiments in this circumstance, the transmitter terminates transmission of the power waves to the location of the electronic device. In further embodiments, the transmitter forms a null space in the power waves at the location of the electronic device.

Figure 4:
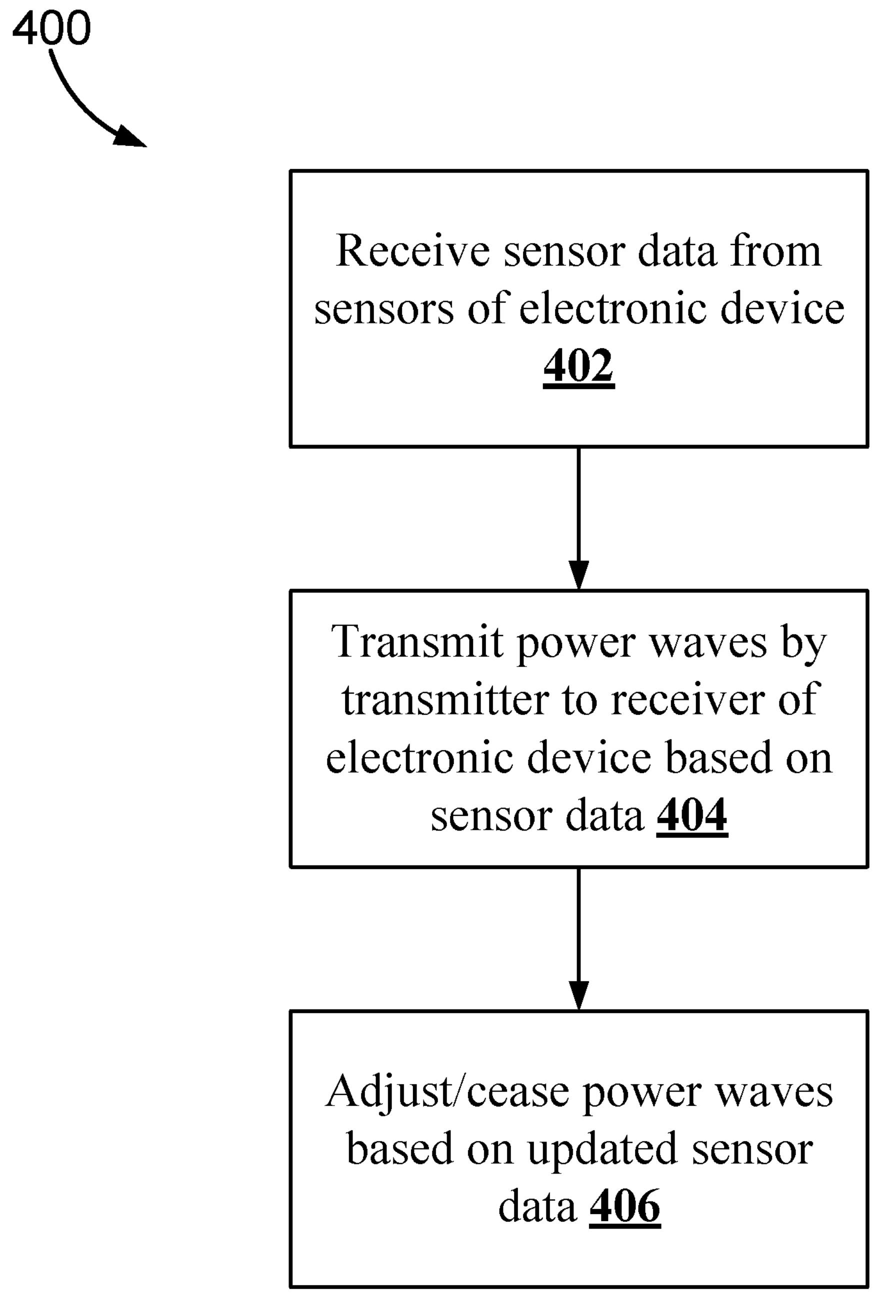
FIG. 4 is a flow diagram illustrating a method of transmitting power waves to or nearby receivers coupled to or integrated into electronic devices located within a transmission field of one or more transmitters of a wireless power transmission system, according to an exemplary embodiment.

FIG. 4 is a flow diagram illustrating a method 400 of transmitting power waves to or nearby receivers coupled to or integrated into electronic devices located within a transmission field of one or more transmitters of a wireless power transmission system, according to an exemplary embodiment.

At step 402, a transmitter receives sensor data from one or more sensors of the electronic device. In an embodiment, the electronic device may include one or more sensors. It should be understood by someone skilled in the art that the sensors may be included in the electronic device or they may be included in the receiver, or both. It should also be understood that the receiver may be an integral part of the electronic device or may be removably connected to the electronic device.

The one or more sensors may be selected from a group consisting of an accelerometer, a gyroscope, and an ambient light sensor. Each of the one or more sensors may work independently to produce sensor data. In some embodiment, each of the one or more sensors work together to produce sensor data. The sensor data may be used in determining presence of proscribed conditions as the sensor data is generated, or a time average of multiple sensor outputs may be used in determining the proscribed condition exists.

In some embodiments, the transmitter receives the sensor data at different points in time from the one or more sensors of the electronic device. The one or more proscribed circumstances may then be calculated based upon the sensor data obtained over a period of time. In one embodiment, a proscribed motion circumstance may be represented by a change of value of the sensor data over the different points in time and thereby indicating a motion of the electronic device. In another embodiment, a proscribed orientation circumstance of the electronic device is a change in orientation of the electronic device indicated by the sensor data at different points in time. In another embodiment, clocking data may be generated to determine the period of time since the last change according to one or more sensor-related circumstances described above.

At step 404, the transmitter transmits power waves that converge in a three-dimensional space to form a constructive interference pattern at the receiver based on the sensor data. In some embodiments, multiple transmitters and/or multiple receivers may power various electronic devices. The receiver may be separable from the electronic device or integrated with the electronic device.

At step 406, the transmitter may receive updated sensor data at different points in time from the one or more sensors of the electronic device, and may adjust (e.g., increase, decrease, or cease) transmission based upon the updated sensor data. For example, when the updated sensor data indicates a likely proximity of a living being or sensitive object with the power waves or electronic device, the transmitter may adjust (e.g., increase, decrease, or cease) transmission. In some embodiments, the transmitter reduces the power level of the power waves. In other embodiments, the transmitter terminates transmission of the power waves. In other embodiments in this circumstance, the transmitter terminates transmission of the power waves to the location of the electronic device. In further embodiments, the transmitter forms a null space in the power waves at the location of the electronic device.

Figure 5:
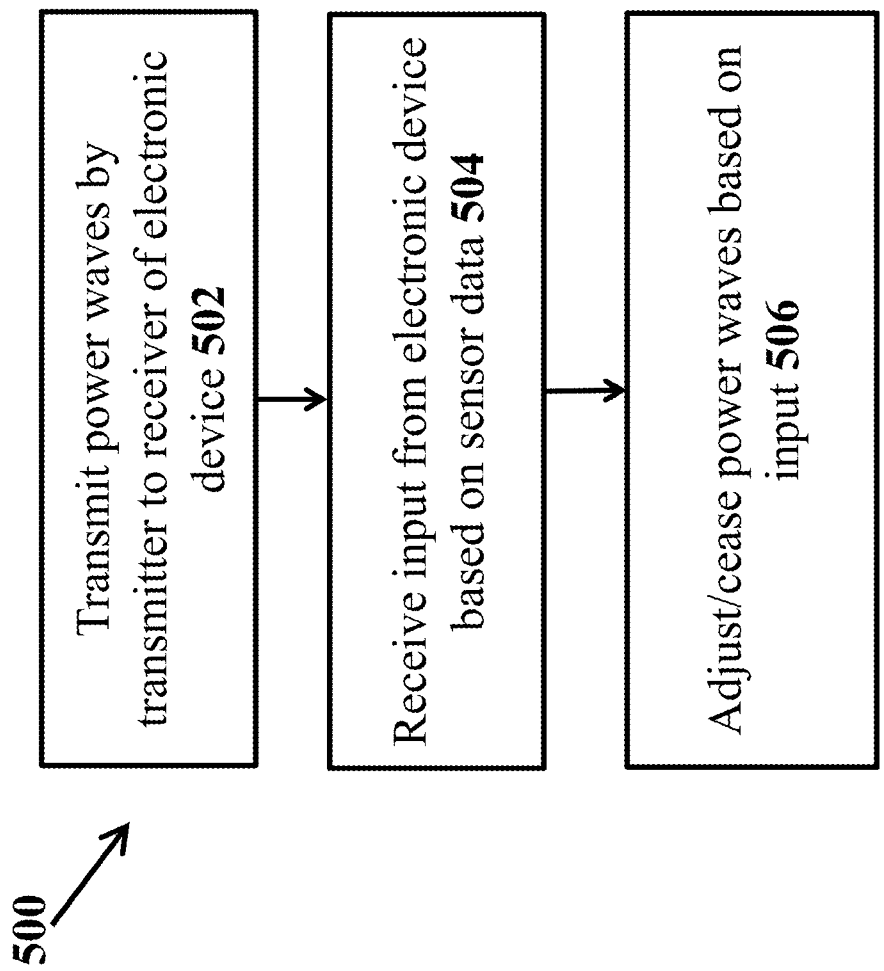
FIG. 5 is a flow diagram illustrating a method of transmission of power waves to receivers of electronic devices within a transmission field of a transmitter of a wireless

FIG. 5 is a flow diagram 500 illustrating a method of transmitting power waves to receivers coupled to or integrated into electronic devices located within a transmission field of a transmitter of a wireless At step 502, a transmitter transmits power waves that converge in three dimensional space to form a constructive interference pattern at or proximate to the location of the receiver. In some embodiments, multiple transmitters and/or multiple receivers may power various electronic devices. The receiver may be separable from the electronic device or integrated with the electronic device.

At step 504, the transmitter receives input from the electronic device. The input is determined by the electronic device based on sensor data. In an embodiment, the electronic device may include one or more sensors. It should be understood by someone skilled in the art that the sensors may be included in the electronic device or they may be included in the receiver, or both. It should also be understood that the receiver may be an integral part of the electronic device or may be removably connected to the electronic device.

The one or more sensors may be selected from a group consisting of an accelerometer, a gyroscope, and an ambient light sensor. Each of the one or more sensors may work independently to produce sensor data that is processed by the electronic device. In some embodiment, each of the one or more sensors work together to produce sensor data. The sensor data from the electronic device may include orientation data, motion data, and/or ambient light data, or may be representative of one or more proscribed circumstance that may indicate when a living being or sensitive object, such as a human, may be interacting with the electronic device and thus in close proximity to a pocket of energy, power waves, and/or the transmitter. In some embodiments, the proscribed circumstances may include a proscribed orientation circumstance, a proscribed motion circumstance, and/or a proscribed ambient light circumstance of the electronic device.

In response to the sensor data received from the sensors, a processor of the electronic device may process the sensor data and determine whether to reduce intensity of power waves, terminate transmission of power waves, or may form a null space at or near the electronic device, among a number of additional or alternative actions. Based on the determinations whether to reduce intensity of power waves, terminate transmission of power waves, or may form a null space at or near the electronic device, the electronic device generate an input comprising instructions to reduce intensity of power waves, terminate transmission of power waves, or may form a null space at or near the electronic device and send it to the transmitter.

At step 506, the transmitter, based on the input received from the electronic device, adjust (e.g., increase, decrease, or cease) transmission based upon a likely proximity of a living being or sensitive object with the power waves or electronic device. In some embodiments, the transmitter reduces the power level of the power waves. In other embodiments, the transmitter terminates transmission of the power waves. In other embodiments in this circumstance, the transmitter terminates transmission of the power waves to the location of the electronic device. In further embodiments, the transmitter forms a null space in the power waves at the location of the electronic device.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

What is claimed is:

1. A method for wireless power transmission comprising:

at a wireless power transmitter comprising a communications component, antennas that are distinct from the communications component, and one or more processors:

requesting, via the communications component, sensor data from a receiver device;

receiving, via the communications component, sensor data from the receiver device in response to the request, wherein the sensor data is generated by one or more sensors of the receiver device;

determining, by the one or more processors, whether the receiver device is in a proscribed state for wireless power reception based, on the received sensor data; and in accordance with determining that the receiver device is not in the proscribed state: transmitting, by antennas of the wireless power transmitter, a plurality of wireless power transmission waves to the receiver device so that each wireless power transmission wave of the plurality of wireless power transmission waves constructively interferes with at least one other wireless power transmission wave of the plurality of wireless power transmission waves.

2. The method of claim 1, wherein the one or more sensors are selected from the group consisting of an accelerometer, a gyroscope, an orientation sensor, and an ambient light sensor.

3. The method of claim 1, wherein determining whether the receiver device is not in the proscribed state comprises determining that the receiver device is positioned in a substantially horizontal orientation based on the received sensor data.

4. The method of claim 3, wherein:

the received sensor data includes orientation data for first and second points in time;

the receiver device is positioned in a substantially horizontal orientation at the first point in time; and determining that the receiver device is positioned in the substantially horizontal orientation comprises determining that differences, if any, in first orientation data from the first point in time as compared to second orientation data from the second period of time do not satisfy an orientation-change threshold.

5. The method of claim 1, wherein determining whether the receiver device is not in the proscribed state comprises determining that the receiver device is stationary based on the received sensor data.

6. The method of claim 5, wherein:

the received sensor data includes motion data for at least two different points in time, and determining that the receiver device is stationary comprises determining that differences, if any, in respective motion data from the at least two different points in time do not satisfy a movement-detection threshold.

7. The method of claim 1, wherein determining whether the receiver device is not in the proscribed state comprises determining that an ambient light reading included in the received sensor data satisfies a light-detection threshold.

8. The method of claim 1, further comprising, at the wireless power transmitter:

in accordance with determining that the receiver device is in the proscribed state, forgoing transmission of the plurality of wireless power transmission waves.

9. The method of claim 1, further comprising, at the wireless power transmitter while transmitting the plurality of wireless power transmission waves:

requesting, via the communications component, additional sensor data from the receiver device;

receiving, via the communications component, additional sensor data from the receiver device in response to the request, wherein the additional sensor data is generated by the one or more sensors of the receiver device;

determining, by the one or more processors, whether the receiver device is in the proscribed state for wireless power reception based on the additional sensor data; and in accordance with determining that the receiver device is in the proscribed state for wireless power reception based on the additional sensor data, ceasing transmission of the plurality of wireless power transmission waves.

10. The method of claim 9, further comprising, at the wireless power transmitter while transmitting the plurality of wireless power transmission waves:

in accordance with determining based on the additional sensor data that (i) the receiver device is not in the proscribed state and (ii) the receiver device has changed location, adjusting at least one characteristic of the plurality of wireless power transmission waves.

11. The method of claim 10, wherein the at least one characteristic is selected from the group consisting of phase, gain, direction, amplitude, and frequency.

12. A wireless power transmitter comprising:

a communications component;

antennas that are distinct from the communications component;

one or more processors; and memory storing one or more programs that are configured for execution by the one or more processors, the one or more programs including instructions for:

requesting, by the communications component, sensor data from a receiver device;

receiving, by the communications component, sensor data from the receiver device in response to the request, wherein the sensor data is generated by one or more sensors of the receiver device;

determining, by the one or more processors, whether the receiver device is in a proscribed state for wireless power reception based on the received sensor data; and transmitting, by the antennas, a plurality of wireless power transmission waves to the receiver device in accordance with determining that the receiver device is not in the proscribed state so that each wireless power transmission wave of the plurality of wireless power transmission waves constructively interferes with at least one other wireless power transmission wave of the plurality of wireless power transmission waves.

13. The wireless power transmitter of claim 12, wherein the one or more sensors are selected from the group consisting of an accelerometer, a gyroscope, an orientation sensor, and an ambient light sensor.

14. The wireless power transmitter of claim 12, wherein determining whether the receiver device is not in the proscribed state comprises determining that the receiver device is positioned in a substantially horizontal orientation based on the received sensor data.

15. The wireless power transmitter of claim 14, wherein:

the received sensor data includes orientation data for first and second points in time;

the receiver device is positioned in a substantially horizontal orientation at the first point in time; and determining that the receiver device is positioned in the substantially horizontal orientation comprises determining that differences, if any, in first orientation data from the first point in time as compared to second orientation data from the second period of time do not satisfy an orientation-change threshold.

16. The wireless power transmitter of claim 12, wherein determining whether the receiver device is not in the proscribed state comprises determining that the receiver device is stationary based on the received sensor data.

17. The wireless power transmitter of claim 16, wherein:

the received sensor data includes motion data for at least two different points in time, and determining that the receiver device is stationary comprises determining that differences, if any, in respective motion data from the at least two different points in time do not satisfy a movement-detection threshold.

18. The wireless power transmitter of claim 12, wherein determining whether the receiver device is in the pre-approved state comprises determining that an ambient light reading included in the received sensor data satisfies a light-detection threshold.

19. The wireless power transmitter of claim 12, wherein the one or more programs further include instructions for:

in accordance with determining that the receiver device is in the proscribed state, forgoing transmission of the plurality of wireless power transmission waves.

20. The wireless power transmitter of claim 12, wherein the one or more programs further include instructions for, while transmitting the plurality of wireless power transmission waves:

requesting, via the communications component, additional sensor data from the receiver device;

receiving, via the communications component, additional sensor data from the receiver device in response to the request, wherein the additional sensor data is generated by the one or more sensors of the receiver device;

determining, by the one or more processors, whether the receiver device is in the proscribed state for wireless power reception based on the additional sensor data; and in accordance with determining that the receiver device is in the proscribed state for wireless power reception based on the additional sensor data, ceasing transmission of the plurality of wireless power transmission waves.

21. The wireless power transmitter of claim 19, wherein the one or more programs further include instructions for, while transmitting the plurality of wireless power transmission waves:

in accordance with determining based on the additional sensor data that (i) the receiver device is not in the proscribed state and (ii) the receiver device has changed location, adjusting at least one characteristic of the plurality of wireless power transmission waves.

22. The wireless power transmitter of claim 20, wherein the at least one characteristic is selected from the group consisting of phase, gain, direction, amplitude, and frequency.

23. The method of claim 9, further comprising, at the wireless power transmitter while transmitting the plurality of wireless power transmission waves:

in accordance with determining based on the additional sensor data that (i) the receiver device is not in the proscribed state and (ii) the receiver device has changed orientation, adjusting at least one characteristic of the plurality of wireless power transmission waves.

24. The wireless power transmitter of claim 19, wherein the one or more programs further include instructions for, while transmitting the plurality of wireless power transmission waves:

in accordance with determining based on the additional sensor data that (i) the receiver device is not in the proscribed state and (ii) the receiver device has changed orientation, adjusting at least one characteristic of the plurality of wireless power transmission waves.

* * * * *